United States Patent [19]
Deck

[11] Patent Number: 6,028,670
[45] Date of Patent: Feb. 22, 2000

[54] INTERFEROMETRIC METHODS AND SYSTEMS USING LOW COHERENCE ILLUMINATION

[75] Inventor: Leslie L. Deck, Middletown, Conn.

[73] Assignee: Zygo Corporation, Middlefield, Conn.

[21] Appl. No.: 09/008,721

[22] Filed: Jan. 19, 1998

[51] Int. Cl.[7] .................................................. G01B 9/02
[52] U.S. Cl. .......................................... 356/359; 356/357
[58] Field of Search ...................... 356/357, 359, 356/360

[56] References Cited

U.S. PATENT DOCUMENTS

| | | | |
|---|---|---|---|
| 5,133,601 | 7/1992 | Cohen et al. | 356/359 |
| 5,194,918 | 3/1993 | Kino et al. | 356/359 |
| 5,204,734 | 4/1993 | Cohen et al. | 356/359 |
| 5,398,113 | 3/1995 | De Groot | 356/360 |
| 5,402,234 | 3/1995 | Deck | 356/360 |
| 5,471,303 | 11/1995 | Ai et al. | 356/359 |

OTHER PUBLICATIONS

"Efficient nonlinear algorithm for envelope detection in white light interferometry" Kieran G. Larkin, J. Opt. Soc. Am. A/vol. 13, No. 4/ Apr. 1996.

"Three–dimensional image realization in interference microscopy" Stanley S.C. Chim and Gordon S. Kino Applied Optics, vol. 31, No. 14, May 1992.

Optical Shop Testing, Chapter 14, Phase Shifting Interferometers, Greivenkamp et al, pp. 501–598, 1992.

*Primary Examiner*—Samuel A. Turner
*Attorney, Agent, or Firm*—Fish & Richardson P.C.

[57] ABSTRACT

Low coherence illumination is used in interferometric methods and systems which exhibit improved precision and flexibility. According to a first aspect of the invention, both a phase shifting interferometry (PSI) analysis and a scanning white light interferometry (SWLI) analysis are applied to a single 3D interferogram. This allows the precision of PSI to be achieved without being limited by the $2\pi$ phase ambiguity constraint. According to another aspect of the invention, a position of a contrast peak of a broad-band 3D interferogram is located by calculating a single Fourier transform coefficient, using the Fourier transform coefficient to determine an analytic equation which corresponds to the derivative of the visibility function, and locating the peak contrast position by setting the derivative equal to zero. The use of analytic equation contrast peak detection improves accuracy and computational efficiency. According to another aspect of the invention, a PSI analysis is applied to a broad-band 3D interferogram generated using a low coherence illumination source. The ability to perform a PSI analysis on a broadband 3D interferogram promotes flexibility because it allows for a device which can perform both PSI analyses and SWLI analyses without physical alterations to the illumination source.

19 Claims, 12 Drawing Sheets

INTERFEROMETRIC METHODS AND SYSTEMS USING LOW COHERENCE ILLUMINATION

BACKGROUND OF THE INVENTION

1. Field of the Invention

This invention relates to interferometric methods and systems, and more particularly relates to interferometric methods and systems which use low coherence illumination. Specifically, a preferred embodiment of the invention relates to an interferometric system and method in which both a phase shifting interferometry (PSI) analysis and a scanning white light interferometry (SWLI) analysis are applied to a single 3D interferogram (that is, an interferogram which is comprised of an ensemble of camera frames of interference data, as opposed to a 2D interferogram which is comprised of only a single camera frame of interference data) generated using a low coherence illumination source. Another preferred embodiment of the invention relates to an improved system and method for detecting the position of a contrast peak in a 3D interferogram generated using a low coherence illumination source. Finally, another preferred embodiment of the invention relates to a system and method in which a PSI analysis is applied to a broad-band 3D interferogram generated using a low coherence illumination source.

2. Description of the Related Art

Phase shifting interferometry (PSI) is often used for surface profilometry. A primary advantage of PSI is that it is highly precise; the vertical height precision for PSI is a fraction (e.g., 1/100) of the optical wavelength used to conduct the measurement. This precision is achieved because of the principle behind PSI, which is to determine height differences by first determining a phase difference between light received at first and second pixels of an imaging device (corresponding to first and second locations on the test surface), and then using the phase difference to calculate a height difference. A second advantage of PSI is that it has good vibration immunity characteristics because phase data is acquired for all pixels simultaneously and because the data acquisition time is relatively short.

Generally speaking, however, conventional PSI approaches have been subject to at least two major limitations. First, conventional PSI approaches can only profile smooth surfaces. This is because PSI has the well known phase ambiguity constraint that the maximum physical departure between adjacent measurement sites be less than ¼ of the optical wavelength. Stated another way, the maximum phase difference between the reference and test light beams must have an absolute value which is less than $\pi$. This constraint arises because the arctangent function, which is used to convert phase to distance, is only unique within the range $\pm\pi$. This limits the maximum allowable phase difference between the test and reference light beams. Thus, although the use of phase measurements advantageously allows very high precision to be obtained, it disadvantageously limits the maximum physical departure between adjacent measurement sites to ¼ of the optical wavelength.

Because of the phase constraint, scanning white light interferometry (SWLI) is increasingly being used for surface profilometry. Unlike PSI, which uses a narrow-band source (e.g., a laser source) in order to continuously provide high-contrast interference fringes across the entire surface to be profiled, SWLI uses a broad-band source (e.g., filtered white light) to eliminate the PSI phase constraint. In SWLI, the interference pattern which is generated by the broad-band light source contains regions of high contrast for each location on the test surface. The temporal characteristics of a region of high contrast for a given pixel indicates the height of the corresponding location on the test surface. Therefore, by comparing the temporal characteristics of these regions of high contrast (e.g., when the peak of each high contrast region occurs), a difference in height between two locations can be determined.

The advantage of SWLI is that the maximum physical departure between adjacent measurement sites may be larger than with PSI. Unlike PSI, certain SWLI analysis types do not calculate height differences based on phase differences, and therefore the PSI phase constraint does not apply (i.e., SWLI measurements do not exhibit a $2\pi$ phase ambiguity). However, because phase information is not used, certain SWLI analysis types have significantly lower precision than PSI.

Numerous attempts have been made at providing an approach which enjoys the advantages of both PSI and SWLI without suffering any of the disadvantages of either approach. For example, according to one approach, a SWLI measurement is made to produce a first three-dimensional (SWLI) interferogram. Then, the test set-up is changed as needed and, in particular, the light source is changed from a broad-band light source to a narrow band light source. Then, a PSI measurement is made to produce a second three-dimensional (PSI) interferogram. Next, the information obtained from the two separate interferograms (SWLI and PSI) is combined to obtain the surface topography.

This approach, however, suffers its own disadvantages. First, the different spectral and acquisition requirements of the SWLI and PSI measurements requires the interferometer to be able to generate both broad-band and narrow-band illumination and to be able to perform two different types of acquisitions (SWLI and PSI). This increases system cost. Additionally, the fact that two separate measurements are made (including equipment changes) causes measurement time to increase and thereby causes throughput to decrease. Moreover, the delay between the two acquisitions increases susceptibility to errors arising from vibrations, shifts in test surface position, and other error sources.

According to another approach, a SWLI acquisition is performed and a frequency domain analysis (FDA), for example a Fourier analysis, is performed on data generated by the SWLI acquisition. The frequency domain analysis extracts phase information from the SWLI data to improve the precision of the SWLI measurement. The advantage of this approach is that it has nearly the precision of PSI but without the $2\pi$ phase ambiguity constraint. The disadvantage of this approach is that, for those features which are vertically separated, it suffers reduced immunity to vibrations as compared to conventional PSI approaches, because the interference data is acquired at different times during different portions of the SWLI scan. Therefore, external vibrations and other detrimental events occurring in the interim can corrupt the measurement.

Ultimately, the precision with which SWLI measurements can be performed is governed by the precision with which contrast peak detection can occur. Prior art peak detection methods have been characterized by curve fitting approaches which rely heavily on ad-hoc assumptions, and which are therefore not particularly accurate. Therefore, in an approach which combines the advantages of PSI and SWLI without any of the associated disadvantages, it would be advantageous if such an approach could also incorporate a more accurate contrast peak detection process. Indeed, since a more accurate contrast peak detection process could generally be used in any SWLI-type approach, such a process would be quite valuable above and beyond the context of a combined SWLI and PSI approach.

A second major limitation of conventional PSI approaches is that they cannot be used in conjunction with a short coherence length illumination source. (Herein, the terms "short coherence length illumination" and "low coherence illumination" are used interchangeably, as are the terms "long coherence length illumination" and "high coherence illumination".) Since short coherence length illumination sources are used for performing SWLI measurements, it would be advantageous if short coherence length illumination sources could also be used for performing PSI measurements, since this would enable the provision of a single interferometric instrument which can perform both types of measurements without significant hardware changes. The reason for the difficulty which has been encountered in attempting to perform PSI measurements using a short coherence length illumination source is as follows. Conventional PSI measures differences in height by measuring differences in phase. During this process, the phase calculations are performed using data which is simultaneously acquired across the entire test surface. In other words, for example, data taken from the same sequence of five scan positions is used in phase calculations for all pixels. If non-simultaneously acquired data is used, then part of the phase difference between two locations will be attributable to the fact that the two locations are at different vertical heights, but part of the phase difference also will be attributable to the scanning of the interferometer. Therefore, in order to address this problem, simultaneously acquired data is utilized.

However, the requirement for acquiring data simultaneously forces the use of long coherence length illumination sources. If a short coherence length illumination source is used, then there is typically not a series of scan positions during which high contrast interference is available across the entire surface. Therefore, data cannot be simultaneously acquired across the entire surface, as is required.

A high coherence illumination source produces high contrast interference throughout a much larger range of scan positions as compared to a low coherence source, thereby making it possible to acquire data simultaneously acquired across the entire surface.

BRIEF SUMMARY OF THE INVENTION

A first primary object of the invention is to provide an interferometric system and method in which both a PSI analysis and a SWLI analysis are applied to a single 3D interferogram generated using a low coherence illumination source.

Another object of the invention is to provide a system and method which obtain highly repeatable and accurate profiles of surfaces whose vertical departure exceeds the phase ambiguity constraint of standard PSI.

Yet another object of the invention is to provide a system and method which produce measurements of surfaces with large vertical departures in which the measurements have reduced susceptibility to vibration as compared to purely SWLI methods.

According to a first aspect of the invention, the invention provides a method of determining a difference in height between first and second locations on a test surface using a single three-dimensional interferogram. The method comprises the steps of producing the single three-dimensional interferogram, and performing both a scanning white light interferometry analysis and a phase shifting interferometry analysis on the single three-dimensional interferogram.

According to another aspect of the invention, the method comprises producing an interferogram using a low coherence illumination source, imaging the interferogram on a photosensitive device, performing a scanning white light interferometry analysis on the three-dimensional interferogram to determine a gross indication of the difference in height, performing a phase shifting interferometry analysis on the same three-dimensional interferogram to determine a fine indication of the difference in height, and combining the gross height indication with the fine height indication to determine the difference in height.

The step of performing a scanning white light interferometry analysis on the three-dimensional interferogram to determine a gross indication of the difference in height further includes the following steps. First, a first position of a first contrast peak is determined for the light received by a first pixel which receives light reflected from the first location. Additionally, a second position of a second contrast peak is determined for the light received by a second pixel which receives light reflected from the second location. Next, an elapsed time interval is calculated between the occurrence of the first and second contrast peaks. Then, the first indication of the difference in height is calculated based on the elapsed time interval and a scan velocity.

The step of performing a phase shifting interferometry analysis on the three-dimensional interferogram to determine a fine indication of the difference in height further includes the following steps. First, first and second weighted sums of intensities are calculated. The intensities which are used in the first and second weighted sums of intensities are intensities of the light received at the first pixel measured at first a sequence of optical path difference positions. Then, a first phase for the light received at the first pixel is calculated by calculating an arctangent of the first and second weighted sums of intensities.

Additionally, third and fourth weighted sums of intensities are calculated. The intensities which are used in the third and fourth weighted sums of intensities are intensities of the light received at the second pixel measured at a second sequence of optical path difference positions. Then, a second phase for the light received at the second pixel is calculated by calculating an arctangent of the third and fourth weighted sums of intensities. Finally, the first phase is compared with the second phase to yield the fine indication of the difference in height.

A second primary object of the invention is to provide an improved system and method for detecting the position of a contrast peak in a broad-band 3D interferogram generated using a low coherence illumination source.

Another object of the invention is to provide an improved system and method for detecting the position of a contrast peak in a broad-band 3D interferogram in which the position is determined using an analytic equation and a low order Fourier transform coefficient.

According to a second aspect of the invention, the invention provides a method of determining a position of a peak of a contrast function. The light is received at a pixel of an imaging device in the form of a three dimensional interferogram comprised of a carrier modulated by the contrast function. The method includes the steps of digitally sampling an intensity variation of the three-dimensional interferogram to acquire a number N of samples, determining M frequency domain transform coefficients based on the intensity variation, and using L frequency domain transform coefficients in an equation which determines the position of the peak of the contrast function. The L frequency domain transform coefficients are among the M frequency domain transform coefficients, and correspond to a low frequency component of the intensity variation.

A third primary object of the invention is to provide a system and method in which a PSI analysis is applied to a broad-band 3D interferogram generated using a low coherence illumination source.

Another object of the invention is to provide a system and method in which non-simultaneously acquired interference data may be phase connected so as to permit a PSI analysis to be applied to the interference data.

Another object of the invention is to provide a system and method in which temporal phase unwrapping and temporal phase stitching are used to phase connect non-simultaneously acquired interference data.

According to a third aspect of the invention, the invention provides a method of determining a difference in height between first and second locations on a test surface which comprises the steps of producing a three-dimensional interferogram using a low coherence illumination source and performing a phase shifting interferometry analysis on the three-dimensional interferogram. The phase shifting interferometry analysis is performed using a first sequence of scan positions for the first location on the test surface and using a second sequence of scan positions for the second location on the test surface.

Preferably, the step of producing the three-dimensional interferogram further comprises the steps of reflecting a reference light beam from a reference surface and a test light beam from the test surface, recombining the reference light beam and the test light beam, and scanning an optical element along an optical axis while performing reflecting and recombining steps. Additionally, the step of performing the phase shifting interferometry analysis further comprises the steps of imaging the interferogram on a photosensitive device, determining a first phase of the light received at the first pixel, determining a second phase of the light received at the second pixel, phase connecting the first phase with the second phase, and determining the difference in height between the first and second locations based on the first and second phases and based on the phase connecting step.

The photosensitive device includes a first pixel which receives light reflected from the first location and a second pixel which receives light reflected from the second location. The light received at the first pixel has a first high contrast region, and the light received at the second pixel having a second high contrast region which is non-overlapping with the first high contrast region.

When the difference in height between the first and second locations is determined, the determination is made based upon a difference in phase between the first and second phases. A first portion of the phase difference is attributable to the difference in height between the first and second locations, and a second portion of the phase difference is attributable to the scanning which occurs during the scanning step. The step of phase connecting the first phase with the second phase comprises the step of determining the second portion of the phase difference. Preferably, this is performed by determining a scan variation for a third sequence of scan positions which extends between first and second sequences of scan positions used to determine the first and second phases. The scan variation is a phase difference, attributable to the scanning which occurs during step (C), between each consecutive scan position of the third sequence of scan positions.

The present invention is applicable to many different types of interferometric systems, including desensitized interferometric systems.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which.

DETAILED DESCRIPTION OF THE PREFERRED EMBODIMENTS

I. System Components and Architecture

Figure 1:
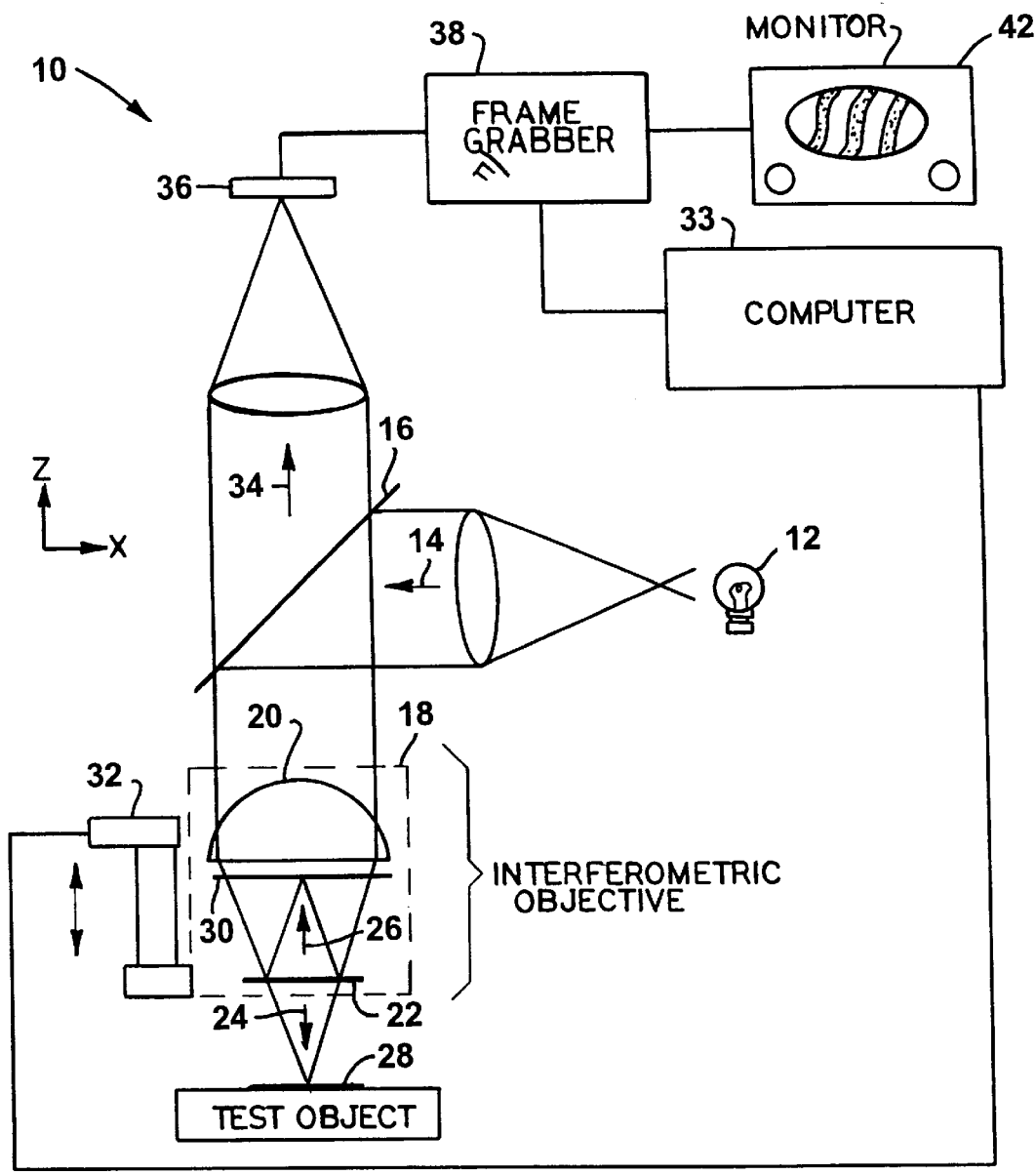
FIG. 1 schematically illustrates a system for making interferometric measurements in accordance with an embodiment of the present invention.

Referring now to FIG. 1, a system 10 for obtaining interferometric measurements is illustrated. The system 10 comprises a low coherence source of illumination 12 which produces an incident light beam 14. The incident light beam 14 is reflected from an optical element 16 towards an interferometric objective or interferometer 18. The interferometer 18 comprises a lens 20 which focuses the incident light beam 14 and a beam splitter 22 which splits the incident light beam into a test light beam 24 and a reference light beam 26. The test light beam 24 is directed towards a test surface 28 of a test object 29. The reference light beam 26 is directed towards a reference surface 30.

A scanning and phase shifting apparatus 32 is also provided which varies the optical path difference and which introduces a phase shift between the test light beam 24 and the reference light beam 26. The apparatus 32, which could for example be a piezoelectric transducer, is controlled by a computer 33. The scanning apparatus 32 scans the interferometer 18 parallel to the optical axis (Z-axis) at constant velocity. The scanning velocity is controlled by the computer 33 so that consecutive images correspond to 90° phase increments.

After the test light beam 24 is reflected from the test surface 28, and after the reference light beam 26 is reflected from the reference surface 30, the two beams 24 and 28 are recombined by the beam splitter 22 so as to form a recombined light beam 34. The recombination of the two light beams 24 and 28 causes constructive and destructive interference between the two light beams 24 and 28. Therefore, when the recombined light beam 34 is directed towards an imaging array 36, an interferogram formed by the recombined light beam 34 is imaged thereon.

The imaging array 36 includes a plurality of pixels (e.g., 512×512) which are distributed in an X-Y plane and which each receive light from a specific location of the test surface 26. (The X-direction is as shown, the Y-direction is as looking into the page of FIG. 1) The imaging array is preferably a camera and, even more preferably, is a charge coupled device (CCD) camera.

A framegrabber 38 acquires and saves consecutive images or frames while the scanning and phase shifting apparatus 32 scans the interferometer 18 parallel to the optical axis at constant velocity. The consecutive frames contain interference data, and each frame corresponds to a specific optical path difference (OPD) position. If desired, to reduce the amount of acquired data, the framegrabber 38 need only save data about the maximum contrast position for each pixel. A technique which can be used in this manner is disclosed in U.S. Pat. No. 5,402,234, which is hereby expressly incorporated by reference. The framegrabber 38 is controlled by the computer 33.

The interference data acquired by the imaging device 36 and saved by the framegrabber 38 is fed directly from the frame grabber 38 to the computer 33. The computer 33 includes one or more computer programs (for example, in the form of software or firmware) which is executed by a microprocessor of the computer to process the interference data.

The interference data required for a given analysis is acquired and saved in the computer 33 before any analysis is performed on that data. Thus, for example, the analysis associated with determining the phase at a given scan position for a given pixel occurs only after all of the data required for that analysis has been acquired and saved. Similarly, the analysis associated with determining the location of the peak contrast position for a given pixel occurs only after all of the data required for that analysis has been acquired and saved. Unlike at least some other conventional architectures, therefore, the interference data is not fed to the computer 33 by way of high speed electronics which perform analysis of the data "on-the-fly" as the data is acquired, for example, by high speed digital filtering.

The advantage of feeding the interference data directly to the computer 33 is that it provides a large amount of flexibility with respect to the data processing procedures which are utilized. As previously mentioned, although high speed electronics can provide for faster data analysis, they limit the interferometric system to a particular data analysis scheme.

II. Interferometric Process Involving SWLI and PSI Analysis of a Single 3D Interferogram Referring now to FIGS. 2 and 3A–3B, a first embodiment of an interferometric process according to the present invention is illustrated. By way of overview, in the process, both a SWLI analysis and a PSI analysis are performed on a single 3D interferogram. The SWLI analysis is used to determine a gross indication as to the difference in height between two test surface locations, and the PSI analysis is used to determine a fine indication as to the difference in height between the two locations. In particular, the SWLI analysis is used to determine a gross phase difference (e.g., a phase difference whose uncertainty is less than, and preferably significantly less than, the PSI ambiguity of ±π) and the PSI analysis is used to determine a fine phase difference (e.g., a phase difference which is a fraction of 2π). The gross phase difference and the fine phase difference are then combined to determine a total phase difference, which is then converted to a total height difference. In this way, the high precision of PSI is achieved without being limited to surfaces that have less than ¼ of the optical wavelength separation between adjacent measurement sites.

Figure 2:
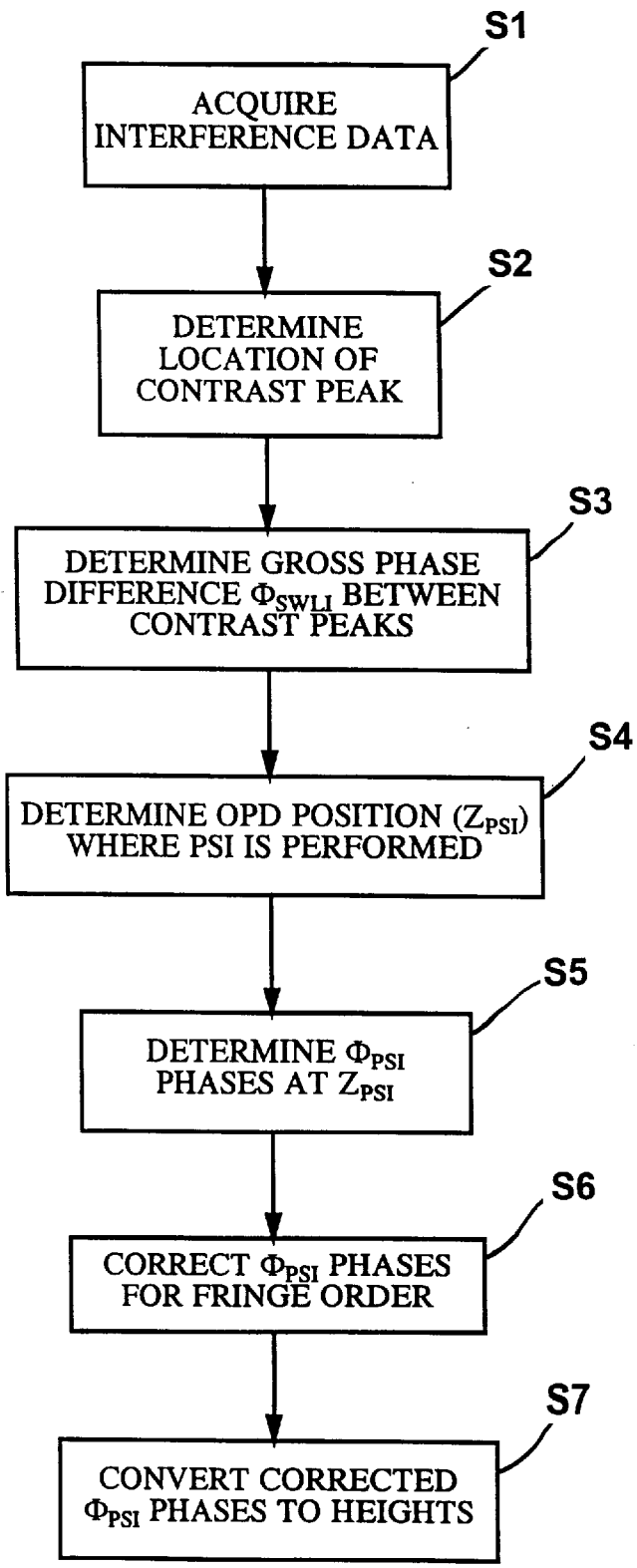
FIG. 2 is a flowchart of an interferometric process in which both a PSI analysis and a SWLI analysis are performed on a single 3D interferogram, in accordance with an embodiment of the present invention.
Figure 3A:
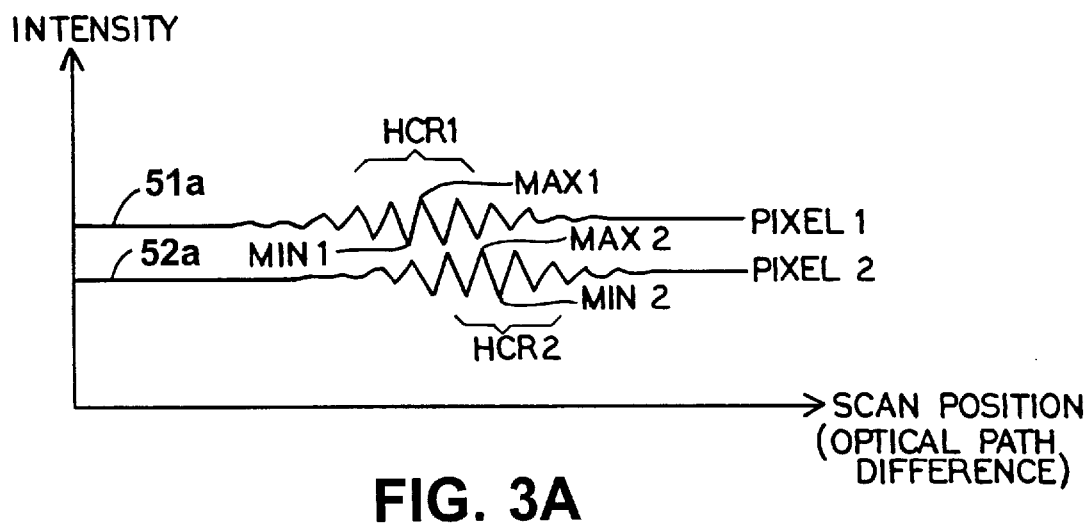
FIGS. 3A and 3B graphically illustrate interference data acquired during the process illustrated in FIG. 2.

More specifically, as illustrated in FIG. 2, the first step in the process (Step S1) is to acquire interference data. FIG. 3A illustrates exemplary interference data acquired by first and second pixels (Pixels 1 and 2) of the imaging device 36. (The designation of the pixels as "Pixel 1" and "Pixel 2" is performed merely for convenience, and is not intended to imply any particular location on or within the imaging device 36 or to imply that the pixels are next to each other.)

The Pixels 1 and 2 each receive light reflected from a different X, Y location on the test surface 28. The interference data is illustrated in the form of two curves 51a and 52a which plot light modulation intensity as a function of scan position (time-varying position along the Z-axis) for the two pixels. Each scan position (or optical path difference position) corresponds to a frame of interference data. The intensity curves 51a and 52a each comprise two (generally flat) regions of low contrast corresponding to scan positions at which no interference occurs between the test and reference light beams 24 and 28. The intensity curves 51a and 52a also each comprise a (generally non-flat) region of high contrast (HCR1 and HCR2, respectively) corresponding to scan positions at which significant interference occurs between the test and reference light beams 24 and 28. The high contrast regions are characterized by the relatively large difference in intensity between maxima (MAX1 and MAX2) and corresponding minima (MIN1 and MIN2). It may be noted that the DC offsets (average intensities) for the two curves 51a and 52a can be the same. However, the curves 51a and 52a have been offset for purposes of clarity.

Figure 3B:
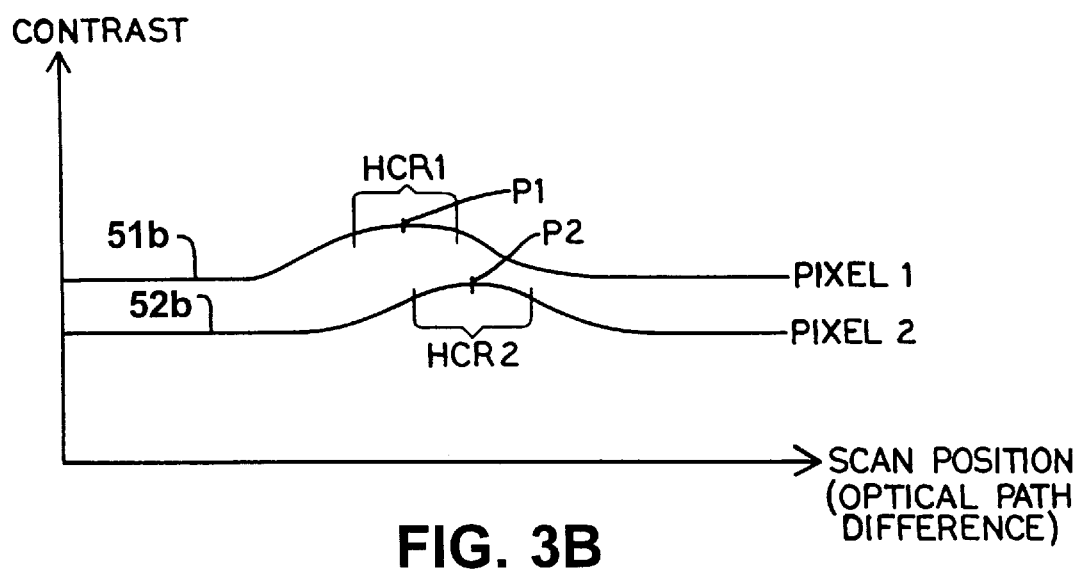

FIG. 3B illustrates two contrast curves 51b and 52b which plot contrast as a function of scan position. The contrast curves 51b and 52b correspond to, and are calculated from, the intensity curves 51a and 52a, respectively. The contrast curves also indicate the contrast peaks P1 and P2 of the high contrast regions HCR1 and HCR2, respectively. There are a number of ways to calculate the contrast curves 51b and 52b, all of which essentially involve low pass filtering the 3D interferogram (curves 51a and 51b) to eliminate the high frequency interference and leave the relatively low frequency contrast variation. Again, the two curves 51b and 52b have been offset for purposes of clarity even though their respective DC offsets (average contrasts) could be the same.

An important aspect of the interference data acquired in Step S1 and illustrated in FIGS. 3A and 3B is the "broadness" of the high contrast regions HCR1 and HCR2. The high contrast regions HCR1 and HCR2 are somewhat broader than those of conventional SWLI data, that is, the contrast curves 51b and 52b rise less rapidly towards a peak contrast value and descend less rapidly therefrom. Thus, the high contrast regions HCR1 and HCR2 have contrast peaks P1 and P2 which are not as well-defined as contrast peaks of conventional SWLI data. With conventional SWLI, it is critical to have high contrast regions with well-defined contrast peaks because the precision of the SWLI measurement depends on the precision with which the locations of the contrast peaks can be determined. The better-defined (i.e. narrower) the contrast peaks, the higher the precision achieved. As described herein, the present invention counterintuitively uses a less well-defined contrast peak, with the surprising result that precision which is higher than that of conventional SWLI measurements is achieved.

As compared to conventional PSI data, the high contrast regions HCR1 and HCR2 are very narrow, and the location of contrast peaks P1 and P2 can be identified with reasonable precision. With conventional PSI, a monochromatic illumination source is used in order to continuously provide high contrast interference across the entire surface to be profiled, regardless of the height variations along the surface. The result is that, for a great range of scan positions, modulation intensity does not change appreciably, and the contrast peak is not easily determined.

The broadness of the high contrast region, and therefore the extent to which the contrast peak is "well-defined," is determined by the coherence of the light source 12. The coherence of the light source 12 depends not only on the source spectrum (e.g., monochromatic versus white light) but also on the optics (e.g., lenses, filters, and so on) used. A conventional PSI light source is theoretically monochromatic, neglecting lenses and practical limitations of laser technology, and therefore has essentially infinite coherence. A conventional SWLI light source is a white light source and therefore has extremely low coherence.

The light source 12 used to acquire the interference data in Step S1 is a low coherence light source. Preferably, in this embodiment, the light source 12 has a high enough coherence to lengthen the high contrast regions HCR1 and HCR2 so that they overlap, but of course not so high that it is impossible to identify contrast peaks. Preferably, the light source 12 is a filtered white light source.

The required illumination spectral properties are best obtained by inspection of the generated interferogram. The coherence length must be large enough to accommodate the maximum physical departure of the test surface so that high contrast interference is obtained at the surface extremes. Since the contrast function is proportional to the Fourier transform of the source spectrum (see Born and Wolf, Principles of Optics, Pergamon Press, $6^{th}$ ed., pp. 322) narrowing the spectrum generally increases the coherence length. However, the coherence length is also affected by the numerical aperture of the imaging and illumination optics.

The maximum physical departure which is expected can be determined, for example, by performing an initial SWLI measurement of a like-shaped surface. For example, in a manufacturing situation, the initial SWLI measurement could be performed on a prototype or sample test surface to configure the interferometric system. Then, after the interferometric system is configured, millions or billions of units could be measured using the process of Steps S1–S10 without performing another SWLI measurement.

After the interference data having the described properties is acquired by the described illumination source at Step S1, the data is converted into information pertaining to the height difference between the two locations on the test surface corresponding to Pixels 1 and 2. It should be noted that while the following process for analyzing the data (Steps S2–S10) is described in conjunction with Pixels 1 and 2, the process is also repeated for all pixels. Thus, for example, Pixel 1 may be used as a reference pixel and the height difference between Pixel 1 and each of the remaining pixels may be determined. As a result, all of the relative height differences become known, and the test surface profile can be displayed in a conventional fashion.

At Step S2, the position $Z_{mc}$ of the point of maximum contrast is determined for each pixel using the acquired intensity histories. By way of example, this could be accomplished in the following manner.

First, the contrast histories for Pixels 1 and 2 are determined and then, based on a search of the contrast histories, the contrast peaks are determined. More specifically, the contrast histories are determined based on the following relationships:

$$\tan(\phi) = S/C \qquad (1)$$

$$V = \sqrt{S^2 + C^2} \qquad (2)$$

where $\phi$ is the phase at a given optical path difference position, V is the contrast at the given optical path difference position, and S and C are weighted sums of intensities measured during the phase shifted acquisition. Assuming, for example, that the Schwider five frame algorithm is used to implement Eq. (1), then S and C assume the following values:

$$S = 2(I_{j-1} - I_{j+1}) \qquad (3a),$$

$$C = 2I_j - I_{j-2} - I_{j+2} \qquad (3b)$$

and Eqs. (1) and (2) take the following form:

$$\tan(\varphi) = \frac{2(I_{j-1} - I_{j+1})}{2I_j - I_{j-2} - I_{j+2}} \qquad (4)$$

$$V_j = \sqrt{(2(I_{j-1} - I_{j+1}))^2 + (2I_j - I_{j-2} - I_{j+2})^2} \qquad (5)$$
$$\text{for } j = 2 \ldots M - 2$$

where $I_j$ is the intensity at a given $j^{th}$ optical path difference position. The contrast history is then determined by using Eq. (5) to compute the contrast $V_j$ at each of the optical path difference positions j=2 ... M−2, i.e., nearly the entire range of optical path difference positions.

A search is then made of all the contrast values $V_j$ for a maximum value. The maximum value $V_j$ is the peak contrast value and corresponds to the peak contrast position. The peak contrast position typically corresponds to the scan position where the optical path difference is a minimum (i.e., to the position where the length of the optical path of the light reflected from the test surface is closest to being equal to the length of the optical path of the light reflected from the reference surface). It may be noted that a more preferred peak detection process is described in the next section.

At Steps S3, a gross phase difference $\phi_{SWLI}$ between locations corresponding to Pixels 1 and 2 is determined. Specifically, the time delay $\Delta T$ between the two contrast peaks P1 and P2 is multiplied by the known ramp phase velocity v.

$$\phi_{SWLI} = v\Delta T \tag{6}$$

At Step S4, the OPD position where the fine phase difference $\phi_{PSI}$ will be calculated (in the next step) is determined. By way of example, this position can be determined by simply calculating the average OPD position of all the pixels determined in the previously performed SWLI analysis. The average OPD position should be a position at which all of the high contrast regions of all of the pixels overlap.

In Step S5, the PSI phases for all the pixels are calculated at the OPD position determined in Step S4. Sampled intensity data symmetrically disposed about this OPD position is used in the PSI calculation. For example, assuming the Schwider 5 frame PSI algorithm is used for the phase determination and the intensity sample number closest to the OPD position calculated in step S4 is M, then the phase for each pixel is calculated using:

$$\phi_{PSI} = \tan^{-1}\left[\frac{2(I_{M-1} - I_{M+1})}{2I_M - I_{M-2} - I_{M+2}}\right] \tag{7}$$

Since the phases calculated in Step S5 have a value within the range of $\pm\pi$ (regardless of the actual total phase difference), Step S6 resolves the $2\pi$ ambiguity by using the gross SWLI phase information calculated in Step S3. This is accomplished by comparing the difference in phases for the two pixels calculated in Step S5 with the phase difference between the same two pixels calculated in Step S3.

$$\Delta\Phi_{12} = \phi_{SWLI,12} - (\phi_{PSI,2} - \phi_{PSI,1}) \tag{8}$$

In theory, $\Delta\phi_{12}$ should be an exact multiple of $2\pi$ (i.e. the difference must be an integer number of fringe orders), but the uncertainties in the SWLI phase calculation typically prevent this from occurring. However, provided that SWLI phase uncertainties are sufficiently small, the fringe order can be determined exactly by adding or subtracting integer multiples of $2\pi$ from $\Delta\Phi_{12}$ until the absolute value of $\Delta\Phi_{12}$ is minimized. The phase due to the fringe order is then added to the phase determined in Step S5. This series of mathematical calculations is conveniently expressed by:

$$\phi_{12} = \phi_{PSI,12} + 2\pi \operatorname{round}\left(\frac{\Delta\Phi_{12}}{2\pi}\right) \tag{9}$$

where the "round" function rounds a number to the nearest integer. This is performed for all pixels.

At Step S7, using the phases calculated in Step S6, the total height difference for pixel i, $z_i$ is calculated as follows:

$$z_i = \phi_i\left(\frac{\lambda}{4\pi}\right)O_c \tag{10}$$

Where $O_c$ accounts for geometric obliquity. Thus, the total difference in vertical height between the two locations corresponding to Pixels 1 and i is determined. The process of Steps S2–S7 may then be repeated so as to determine the heights of all pixels relative to each other, for example, by determining the heights of all pixels relative to Pixel 1. In this manner, the surface profile of the test surface is obtained.

It should be apparent that the fact that the precision of the SWLI measurement is reduced by the broadening of the high contrast region does not affect the overall precision of the measurement, as long as the uncertainty in the SWLI phase determination does not exceed the PSI ambiguity. This is because the SWLI analysis is only used to determine the fringe order, and PSI analysis is used to determine the fractional fringe. Thus, the precision of the SWLI measurement is sufficient so long as the fringe order is accurately identified.

It may also be noted that, in some cases, it may be determined based on the SWLI analysis that the difference in height between some or all of the locations can be determined based on the PSI height information alone, without combining the PSI height information and the SWLI height information. This would be the case where the surface is sufficiently smooth such that no $2\pi$ phase ambiguities are present in the measurement data.

There are thus numerous advantages to the process illustrated in FIG. 2 over conventional interferometric processes. First, the process can be used to measure a vertical departure which is greater than ¼ the optical wavelength of the illumination source, and can do so with the precision of a PSI analysis. The process can be used to measure a vertical departure which is greater than ¼ the optical wavelength because a SWLI analysis is performed. However, the precision of a PSI analysis is also achieved because a PSI analysis is performed on the overlapping portions of the high contrast regions of the broad-band 3D interferogram. As a result, the process is very flexible, and can be used both with smooth surfaces and with surfaces having discontinuities.

Second, it is not necessary to perform two separate acquisitions because the PSI analysis and the SWLI analysis are performed on the same 3D interferogram. Therefore, only a low coherence illumination source is needed, and there is no need to change the illumination source in order to perform a PSI analysis. Therefore, system cost is reduced and throughput is increased.

Third, the measurement is relatively immune to vibration and therefore can be used in a production environment. The PSI analysis is performed on temporally overlapping portions of the high contrast regions HCR1 and HCR2. Susceptibility to vibrations is therefore reduced as compared to FDA-SWLI approaches because the interference data for the PSI analysis is simultaneously acquired.

III. Improved Peak Detection for Broad-Band 3D Interferograms

Referring now to FIGS. 4–12, an improved peak detection process for broad-band 3D interferograms is illustrated.

In the process described above, a conventional contrast peak detection process was used. This was found to be adequate since the precision of the measurement depends on the PSI analysis and not on the SWLI analysis. Nevertheless, in order to further enhance the process described above, the present invention also provides an improved contrast peak detection process.

The need for an improved contrast peak detection arises for the following reason. The above-described process uses broadened high contrast regions so that there is a region of overlap upon which a PSI analysis can be performed. As the vertical departure which must be measured increases, so too must the broadness of the high contrast regions in order for the above-described process to work. However, the more the high contrast regions are broadened, the more difficult (and less accurate) peak detection becomes. Ultimately, a point is reached in which the high contrast regions are so broad that the ability to identify fringe order is compromised and the phase-based analysis contains discontinuous phase errors. Therefore, the present invention also provides a more accurate peak detection process in order to maximize the maximum vertical separation which can be measured with the process described above. As will become apparent, however, the peak detection process is generally applicable and could also be used in combination with more conventional SWLI techniques.

Figure 4:
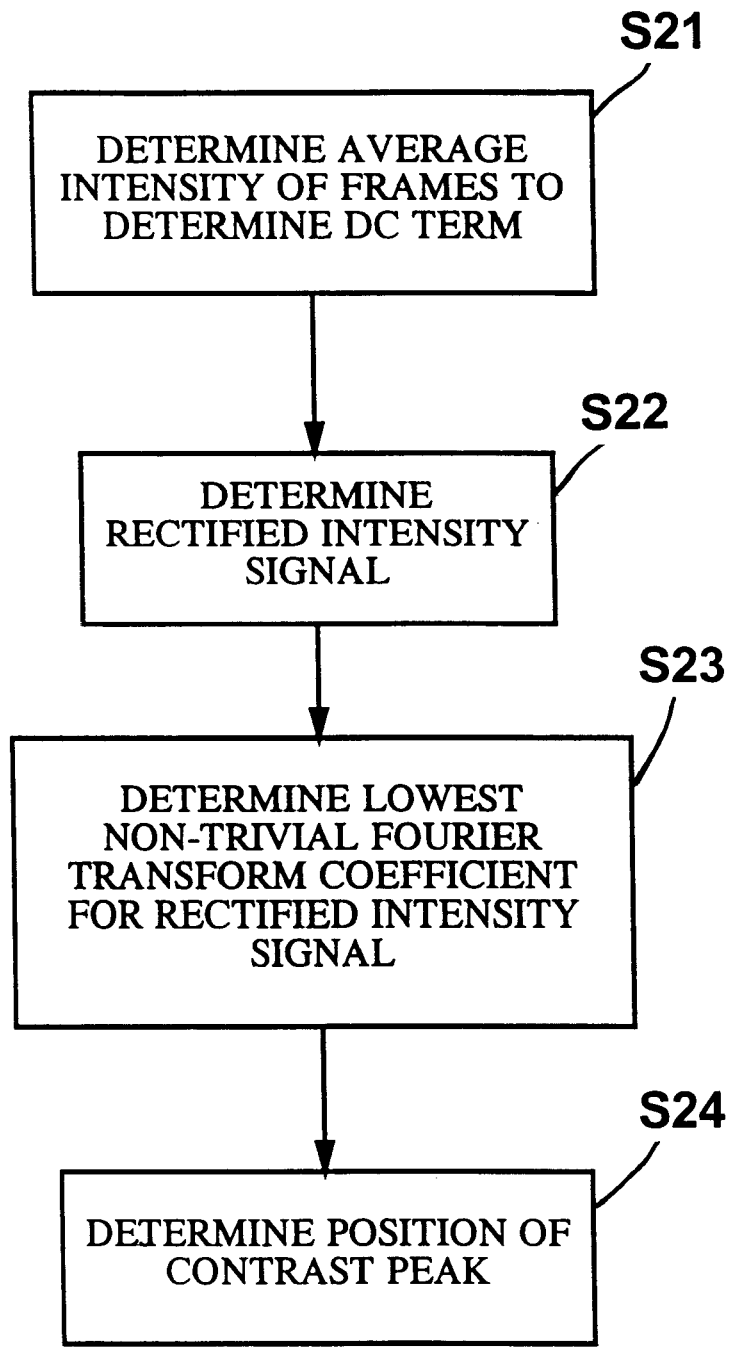
FIG. 4 is a flowchart of a contrast peak detection process in which the position of a contrast peak is determined on the basis of a low order Fourier transform coefficient, in accordance with an embodiment of the present invention.

Referring now FIG. 4, a process for determining the position of a contrast peak according to an embodiment of the invention is illustrated. During the following description of the process, additional equations and graphs are provided for purposes of explaining the mathematical underpinnings of the process.

Figure 5:
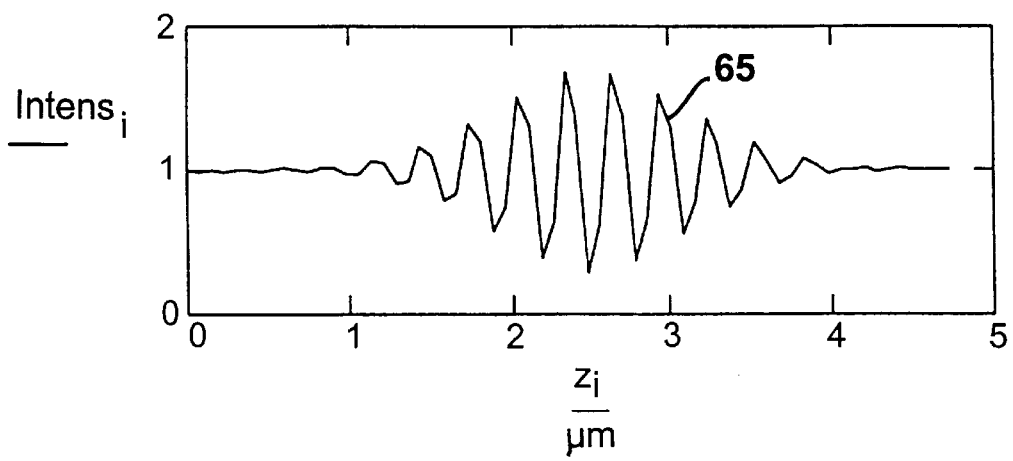
FIG. 5 graphically illustrates an intensity curve having a coherence envelope.
Figure 6:
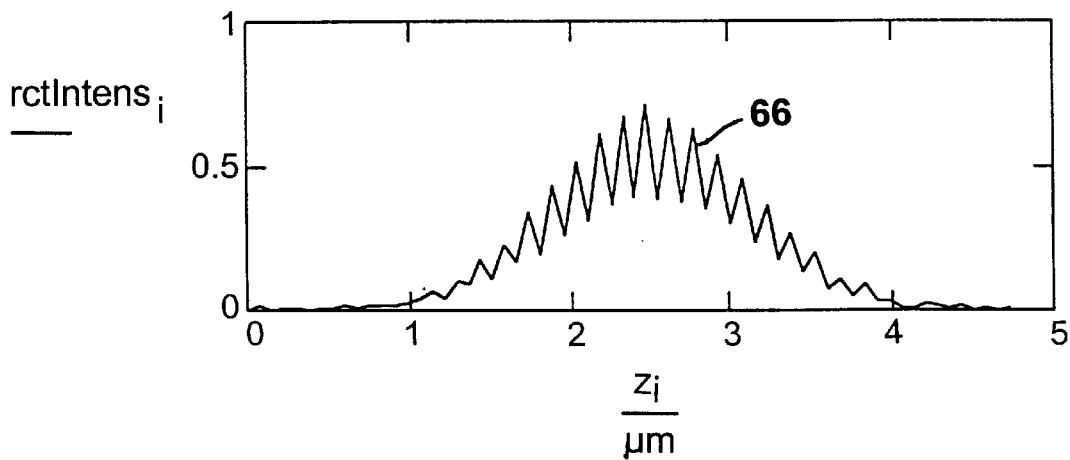
FIG. 6 graphically illustrates a rectified signal corresponding to the intensity curve illustrated in FIG. 5.

Generally speaking, the coherence envelope is a modulation envelope, and the most general method of extracting the coherence envelope is fundamentally an AM demodulation technique. The general functional form for any SWLI 3D interferogram is (and more particularly, the intensity variation for a given (x,y) point in the 3D interferogram) as follows:

$$I = A(1 + V(z)\cos(kz+\phi)) \quad (11)$$

where z is a measure of the distance from the equal path condition, $k = 2\pi/\lambda$ is the wavenumber (spatial frequency), and $V(z)$ is the visibility (or contrast) function. (Herein, the terms "visibility function" and "contrast function" are used interchangably.) The visibility function $V(z)$ is a low frequency amplitude modulation superimposed on a high frequency carrier (i.e., the $\cos(kz+\phi)$ term). The visibility function $V(z)$ is assumed to be a monotonic function with a single, well defined maximum at or very near $z=0$. The curve 65 of FIG. 5 illustrates an acquired coherence envelope of the type described in Eq. (11).

In order to demodulate the coherence envelope, the first step is to remove the DC component. Assuming, for purposes of illustration, that sixty-four frames are acquired, then the DC term is found trivially at Step S21 by simply averaging the sixty-four frames together:

$$DC = \frac{\sum_{i}^{64} I_i}{64} \quad (12)$$

Other methods may be employed to determine the DC term, for example, if the data is acquired at a sampling frequency of 4 samples per fringe (as is typical in SWLI and PSI applications), the sum of any 4 consecutive samples will equal the DC term.

At Step S22, the rectified intensity signal is determined. Based on Eq. (12), the rectified signal can be calculated by subtracting the DC component from the intensity signal I and squaring:

$$I_{rect} = (I_i - DC)^2 \quad (13)$$

Instead of squaring, which is preferred, other methods may be employed, such as taking the absolute value. The rectified intensity signal $I_{rect}$ is represented by curve 66 in FIG. 6. Equation (13) can be rewritten to express the rectified intensity $I_{rect}$ as a function of the visibility function $V(z)$ and the carrier $\cos(kz+\phi)$ as follows:

$$I_{rect} = V(z)^2 \cos(kz+\phi)^2 \quad (13a)$$

Using the trigonometric identity $\cos^2 u = \frac{1}{2} + \frac{1}{2}\cos 2u$, Eq. (13a) can be rewritten as follows:

$$I_{rect} = \frac{1}{2}V(z)^2 + \frac{1}{2}V(z)^2 \cos(2kz+2\phi) \quad (13b)$$

Notably, when the intensity signal I is rectified, the rectification doubles the frequency of the carrier (as compared to the carrier for the original intensity signal I). However, since the intensity signal is typically sampled at a rate of four samples per cycle (i.e., a frame of 90° is used, so that there are four frames taken per 360° cycle), the carrier of the rectified intensity will be right at the Nyquist limit. (According to the Nyquist theorem, two samples per cycle are required in order to accurately represent the frequency content of a signal up to a given frequency without aliasing.) Therefore, except to the extent that the phase ramp is not perfectly linear, the frequency content of the carrier in the rectified intensity signal $I_{rect}$ can be accurately represented in the Fourier transform of the rectified intensity signal $I_{rect}$ without aliasing into lower frequencies.

Figure 7:
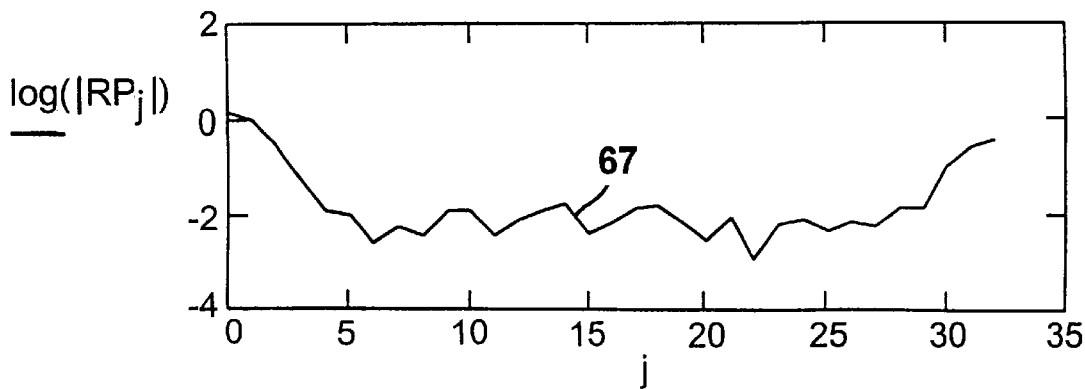
FIG. 7 graphically illustrates the amplitude spectrum of the Fourier transform of the rectified signal illustrated in FIG. 6.

The curve 67 of FIG. 7 illustrates the amplitude spectrum of the Fourier transform of the rectified intensity signal $I_{rect}$. The Fourier transform comprises a series of coefficients $c_m$ each representing the frequency content of the rectified intensity signal $I_{rect}$ at a given frequency. As indicated by Eq.(13b), the rectified intensity signal $I_{rect}$ includes a low frequency component corresponding to the squared visibility function ($\frac{1}{2}V(z)^2$) and a high frequency component corresponding to the carrier ($\frac{1}{2}V(z)^2 \cos(2kz+2\phi)$). Thus, some of the Fourier transform coefficients $c_m$ correspond to the squared visibility function $V(z)^2$ and other coefficients $c_m$ correspond to the carrier. Moreover, assuming no aliasing, the two sets of coefficients are entirely distinct from each other. In the embodiment described herein, this separation of the low and high frequency components of the visibility is achieved through the demodulation implemented by Eqs. (12) and (13).

Therefore, given the Fourier transform coefficients $c_m$ of the rectified intensity signal, an analytic equation for the squared visibility function $V(z)^2$ can be obtained by ignoring those Fourier transform coefficients associated with the carrier and retaining the remaining Fourier transform coefficients:

$$V(z)^2 = \text{Re}\left[\sum_{m}^{N/2} G_m c_m \exp\left(\frac{-2i\pi mz}{N}\right)\right] \quad (14)$$

where $c_m$ are the Fourier transform coefficients, $G_m$ is a low pass transfer function, and N is the number of samples (sixty-four in the present example). (The "Re[ ]" operator of Eq. (14) is used to extract the cosine term from the exponential function (i.e., $e^{iu} = \cos(u) + i\sin(u)$), because the cosine term is the measurable quantity.)

A simple low pass transfer function $G_m$ has a value of either 0 or 1 depending on whether a particular Fourier transform coefficient is to be ignored ($G_m=0$ for coefficients associated with the carrier) or whether the particular Fourier transform coefficient is used to build the visibility function ($G_m=1$ for coefficients not associated with the carrier). More complicated transfer functions that could be employed transition smoothly between the 0 and 1 extremes to reduce the generation of high frequency components that would be introduced from a sharp transition. Essentially, the low pass transfer function is used to eliminate the $\frac{1}{2}V(z)^2 \cos(2kz+2\phi)$ term in Eq.(13b), so that the squared visibility function $V(z)^2$ may be derived based on the Fourier transform coefficients for the rectified intensity signal $I_{rect}$.

At this point, it should be recalled that the goal is to find the position of the contrast peak, i.e., the scan position at which the maximum value of the visibility function $V(z)$ occurs. This position is the same position at which the maximum value of the squared visibility function $V(z)^2$ occurs. Therefore, determining the peak position for the squared visibility function $V(z)^2$ is the same as determining the peak position for the visibility function $V(z)$. Moreover, the location of the peak contrast position is not affected by constant factors (i.e., the multiplication of the derivative by a constant has no affect on the value of z which causes the derivative to be equal to zero). For this reason, and for sake of computational efficiency, constant factors in Eqs. (14)–(17) are ignored.

Figure 9:
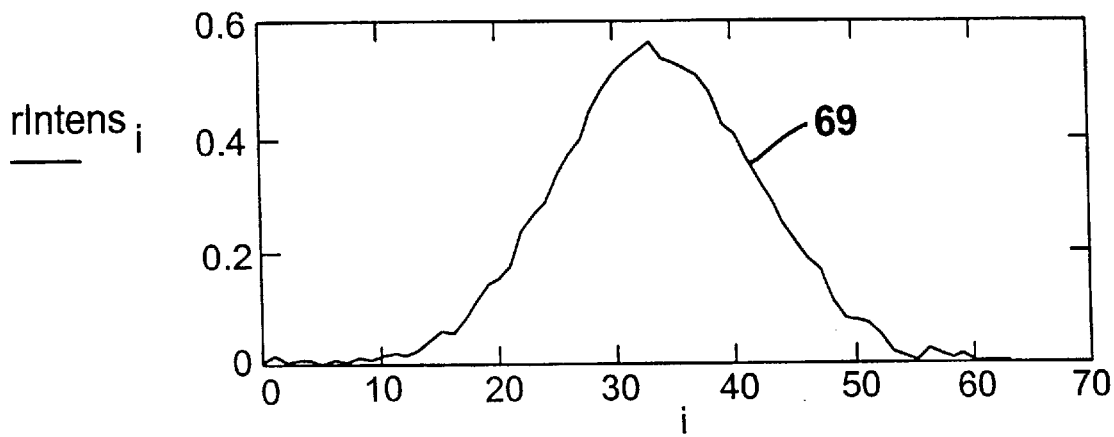
FIG. 9 graphically illustrates a visibility function obtained by low pass filtering and inverse transforming the amplitude spectrum illustrated in FIG. 7.
Figure 8:
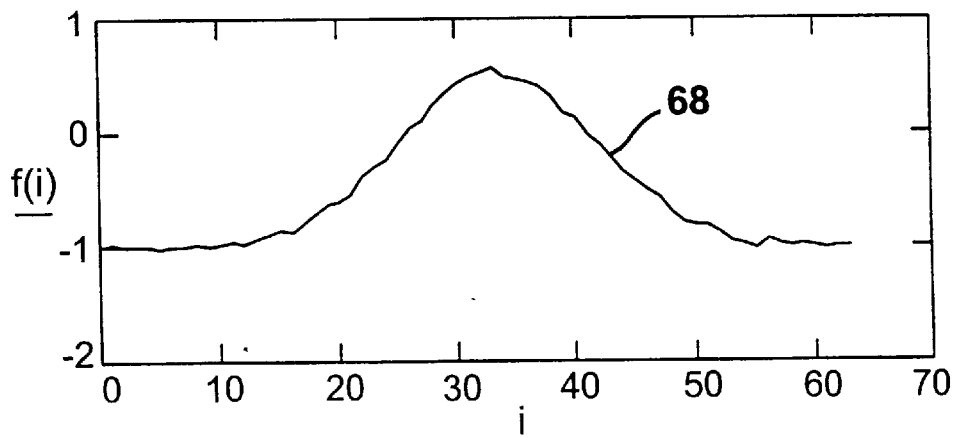
FIG. 8 graphically illustrates a squared visibility function constructed from Fourier transform coefficients of the amplitude spectrum illustrated in FIG. 7.

The curve 68 of FIG. 8 illustrates the visibility function for a low pass filter in which $G_m=1$ for m=0 to 28 and $G_m=0$ for m=29 to 32. For comparison, the curve 69 of FIG. 9 illustrates the squared visibility function obtained by more conventional methods (such as applying an electronically implemented low pass filter followed by inverse Fourier transformation of the resultant signal). As expected, the peak of the two curves occurs at the same position (at about frame 33). The only other differences in terms of the general shapes of the curves 68 and 69, which do not matter for present purposes, can be traced to the fact that constant factors are ignored in Eq. (14).

Although the curves 68 and 69 illustrated in FIGS. 8 and 9 have essentially the same shape, the curve 68 in FIG. 8 has a distinct advantage in that it is represented by an analytic function (Eq.(14)). Thus, whereas numerical techniques must be used to find the peak of the curve 69 in FIG. 9 (thereby requiring empirically-set thresholds and ad hoc curve fitting), analytical techniques may be used to find the peak of the curve 68 in FIG. 8. More specifically, the peak of the curve 68 in FIG. 8 can be determined by calculating the derivative of Eq. (14) and setting the derivative equal to zero. The derivative of Eq. (14) is as follows:

$$\frac{d(V(z)^2)}{dz} = \text{Re}\left[\sum_{m}^{N/2} G_m c_m im \exp\left(\frac{-2i\pi mz}{N}\right)\right] \quad (15)$$

Again, constant factors have been ignored.

If all the terms are kept, it is computationally intensive to determine the value of z at which $d(V(z)^2)/dz$ is equal to zero. However, Eq. (15) can be dramatically simplified by recalling that the visibility function is monotonic with a single well-defined maximum. The maximum is a global maximum due to the low frequency characteristics of the coherence envelope, and not a local maximum due to high frequency variations caused by noise or distortions caused by carrier aliasing. Therefore, the visibility function can be severely low pass filtered by retaining only the lowest nontrivial frequency component (number 1). Thus, the low pass transfer function $G_m$ is set equal to zero for all values of m except m=1. The peak position is thus found using the following equation:

$$\frac{d(V(z)^2)}{dz} = \text{Im}\left[c_1 \exp\left(\frac{-2i\pi z}{N}\right)\right] = 0 \quad (16)$$

Equation (16) differs from Eq. (15) in two respects. First, Eq. (16) lacks a summation sign (because there is nothing to sum, $G_m$ is set equal to zero for all m except m=1). Second, Eq. (16) extracts the imaginary portion of the exponent rather than the real portion (because of the multiplication by i when the derivative of the exponent is taken).

Using the identity $e^{iu}=\cos(u)+i\sin(u)$ and solving for z, Eq. (16) reduces as follows:

$$z = \frac{N}{2\pi} \tan^{-1}\left(\frac{\text{Im}(c_1)}{\text{Re}(c_1)}\right) = \frac{N}{2\pi} \arg(c_1) \quad (17)$$

where $\text{Re}(c_1)$ is the real portion of the Fourier transform coefficient $c_1$ and $\text{Im}(c_1)$ is the imaginary portion of the Fourier transform coefficient $c_1$. The "arg" function determines the phase difference between real and imaginary components of a complex number, and is identical to the four quadrant arctangent of the ratio of the imaginary to real parts of a complex number.

Figure 10:
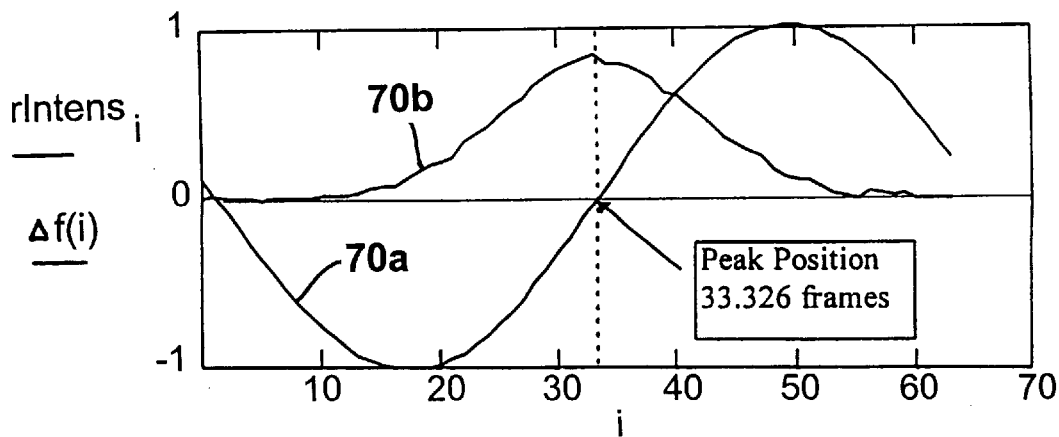
FIG. 10 graphically illustrates the derivative of a squared visibility function constructed from a Fourier transform coefficient of the amplitude spectrum illustrated in FIG. 7.
Figure 11:
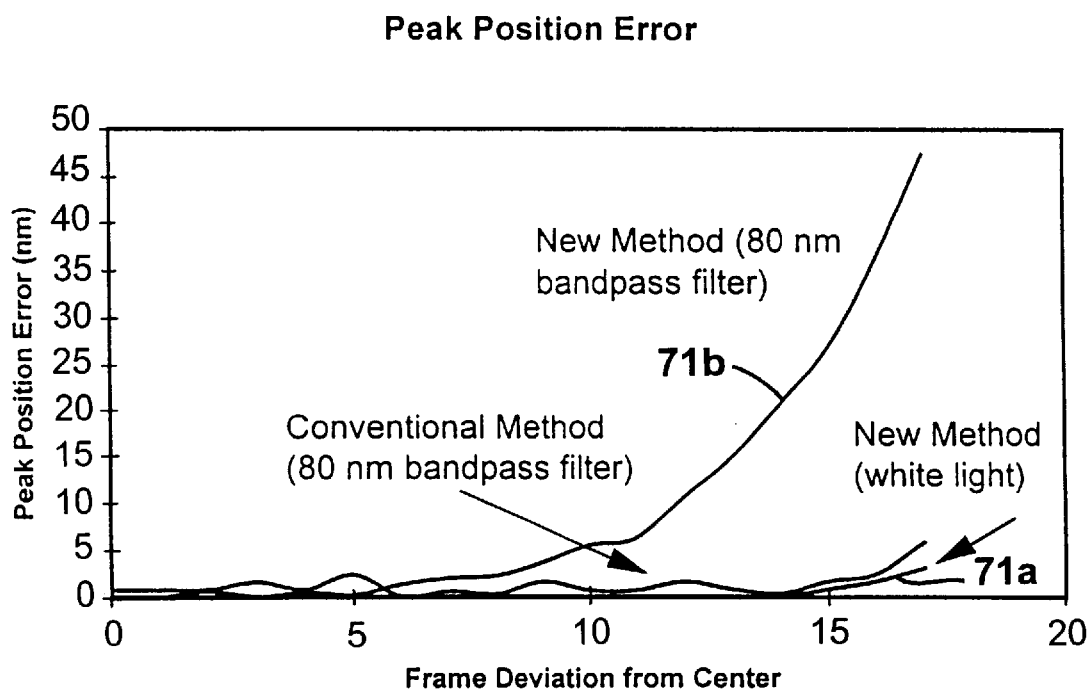
FIG. 11 graphically illustrates peak position error as a function of frame deviation from center for the contrast peak detection process illustrated in FIG. 4.

Therefore, the calculation of the peak modulation position is reduced to calculating a single Fourier transform coefficient (or other frequency domain transform coefficient), and solving Eq. (17) (Steps S23–S24). It should be noted that Eqs. (13a), (13b), (14) (15) and (16) are not actually implemented in the illustrated embodiment of the invention; these equations are provided herein merely for purposes of providing an understanding as to the derivation of Eq. (17). The curves 70a and 70b of FIG. 10 plot the derivative function of Eq. (16) along with the Fourier estimate of the visibility function and show the peak visibility position calculated from Eq. (17), respectively.

If desired, the peak position determination can be improved upon by successive application of Eq. (17) to higher frequency Fourier coefficients. Since the peak position uncertainty will be proportional to the slope of the derivative function at the zero crossing point, and the slope of the Fourier component is proportional to the frequency, an improvement in the peak position determination can be realized by using a higher frequency Fourier coefficient. Of course, since the high frequency components have multiple zero crossings, it is important to use a low order coefficient in addition to the higher order coefficient (or coefficients) since there must be a way to choose amongst the multiple zero crossings identified using the higher order coefficient. Thus, the peak position evaluated from the first, lowest order, components can be used to distinguish the correct zero crossing from the many zero crossings obtained from higher frequency components as long as the error in the first order peak position determination is significantly less than the period of a high frequency cycle. In this way, the peak position determination can be improved by using the higher order frequency coefficients to improve the resolution of the determination made using the low order frequency coefficient.

Simulations of the process show a small error sensitivity to partial interferogram acquisition. The error depends on the width of the coherence envelope and on how much of the envelope is not acquired. The error varies approximately quadratically with peak position once the modulation regions start to be missed and is illustrated graphically by the curve 71a in FIG. 11. For visibility curves similar to that obtained from a 80 nm bandpass optical filter, significant error is introduced only if the envelope peak is miss-acquired with an error beyond 15 frames, as illustrated by curve 71b. This amount of error has not been observed in practice. Moreover, if the complete envelope is captured, then this type of error does not even occur.

Figure 12:
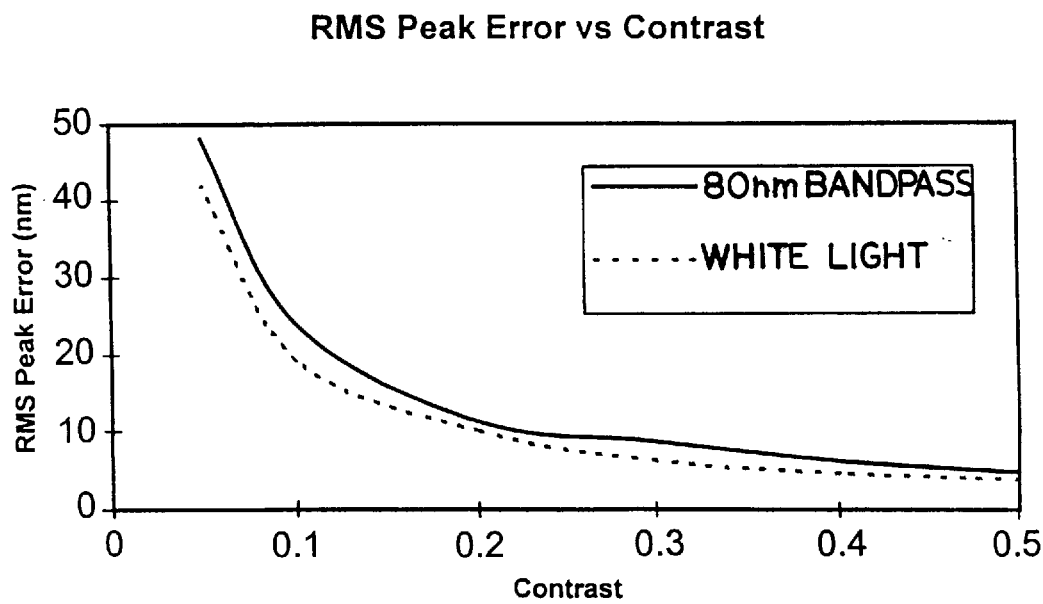
FIG. 12 graphically illustrates RMS error as a function of fringe contrast for the contrast peak detection process illustrated in FIG. 4.

For the process described in the previous section, in which both a SWLI and a PSI analysis are performed on a single 3D interferogram, it is important that the SWLI measurement be sufficiently precise to identify the PSI fringe order. This requirement translates into a required measurement error which is typically less than ±150 nm. The curves 72a and 72b of FIG. 12 show the RMS error of the peak detection process of FIG. 4 as a function of fringe contrast for visibility envelope widths similar to those produced by an 80 nm band pass filter and white light. Clearly, as the contrast falls, the probability of producing a significant error increases rapidly. If the peak measurement should be accurate to within 150 nm (to the $3\sigma$ level), then the visibility contrast must be greater than 5%. Establishing this type of dependence for conventional methods is extremely difficult because of the sensitivity to the many empirically-set thresholds and fit parameters.

There are numerous advantages to the process illustrated in FIG. 4 as compared to conventional peak detection processes. First, the process is computationally efficient. It is not necessary to calculate the entire Fourier transform of the intensity function. Rather, the process essentially only involves calculating a single Fourier transform coefficient and setting a derivative equal to zero. Additionally, many of the computations associated with conventional peak detection methods, such as computations associated with curve filtering, are avoided.

Second, the process is very accurate. In part, the accuracy is achieved because the process is based on an analytic equation derived from first principles. The use of an analytic equation avoids the need for empirically set thresholds and ad-hoc curve fitting procedures. Simulations predict accuracies of 4 nm RMS for white-light 3D interferograms with 50% contrast.

Third, the process is visibility shape independent. The process remains the same regardless whether visibility function has a Gaussian shape, a sinusoidal shape, or some other shape. In contrast, for example, prior art peak detection methods which use a curve fitting approach are visibility shape dependent, because the manner in which the curve fitting is carried out changes depending on the shape of the visibility function.

Fourth, the process is more insensitive to partial interferogram acquisitions than FDA variants of conventional SWLI analysis. Unlike these prior art approaches, the present invention does not experience discontinuities when only part of the visibility function is acquired.

Finally, the process can provide a quantitative error uncertainty as to a particular peak measurement. Because there are no empirically set thresholds and curve fitting parameters, quantitative error prediction can be performed in a straightforward manner.

It should be noted that the improved technique is usable not only in combination with the combination PSI and SWLI approach described above, but also with any broad-band interferometric approach (such as conventional SWLI) in which the location of contrast peaks are used for purposes of analysis.

IV. Interferometric Process for Performing PSI Measurements Using a Low coherence Illumination Source Referring now to FIGS. 13–15, another embodiment of the invention is illustrated. The interferometric process of this embodiment uses a low coherence illumination source and is particularly well-adapted for determining the surface profile of smooth surfaces in which adjacent surface sites have less than ¼ wavelength physical departure (as required by any conventional PSI approach) but in which there is a significant amount of vertical displacement across the surface. For example, a heavily tilted flat is a smooth surface, but it also exhibits a large amount of vertical displacement across its surface.

As previously discussed, conventional PSI measures differences in height by measuring differences in phase. During this process, the phase calculations are performed using data which is simultaneously acquired across the entire test surface. In other words, for example, data taken from the same sequence of five scan positions is used in phase calculations for all pixels. Simultaneously acquired data is used because the scanning of the interferometer itself introduces a phase variation. If non-simultaneously acquired data is used, then part of the phase difference between two locations will be attributable to the fact that the two locations are at different vertical heights, but part of the phase difference also will be attributable to the scanning of the interferometer. Therefore, in order to avoid this problem, simultaneously acquired data is utilized. This, however, limits the maximum vertical departure which can be measured using conventional PSI approaches. If narrow-band illumination is used, the maximum vertical departure limit is often determined by the spatial coherence properties of the system (i.e. depth of focus), whereas if broad-band illumination is employed, the temporal coherence of the illumination (i.e. the spectral width) is often the limiting factor.

For this reason PSI is conventionally performed with narrow-band illumination to maximize the allowable vertical displacement. This solution limits the flexibility of interferometric systems because a system which can perform both SWLI analyses and independent PSI analyses without physically altering the illumination source is not possible.

By way of overview, in order to overcome this problem, the present invention provides a process in which the scan variation (i.e., the phase variation that is attributable to the scan) is tracked throughout the entire scan. As a result, phase variations which are attributable to the scan can be subtracted from phase measurements, leaving only phase variations which are attributable to differences in height. Thus, two pixels whose phases are calculated using non-simultaneously acquired data can be phase connected so that a valid comparison can be made. Moreover, because there is no requirement for data to be simultaneously acquired, it is possible to perform the process using a low coherence illumination source.

Figure 13:
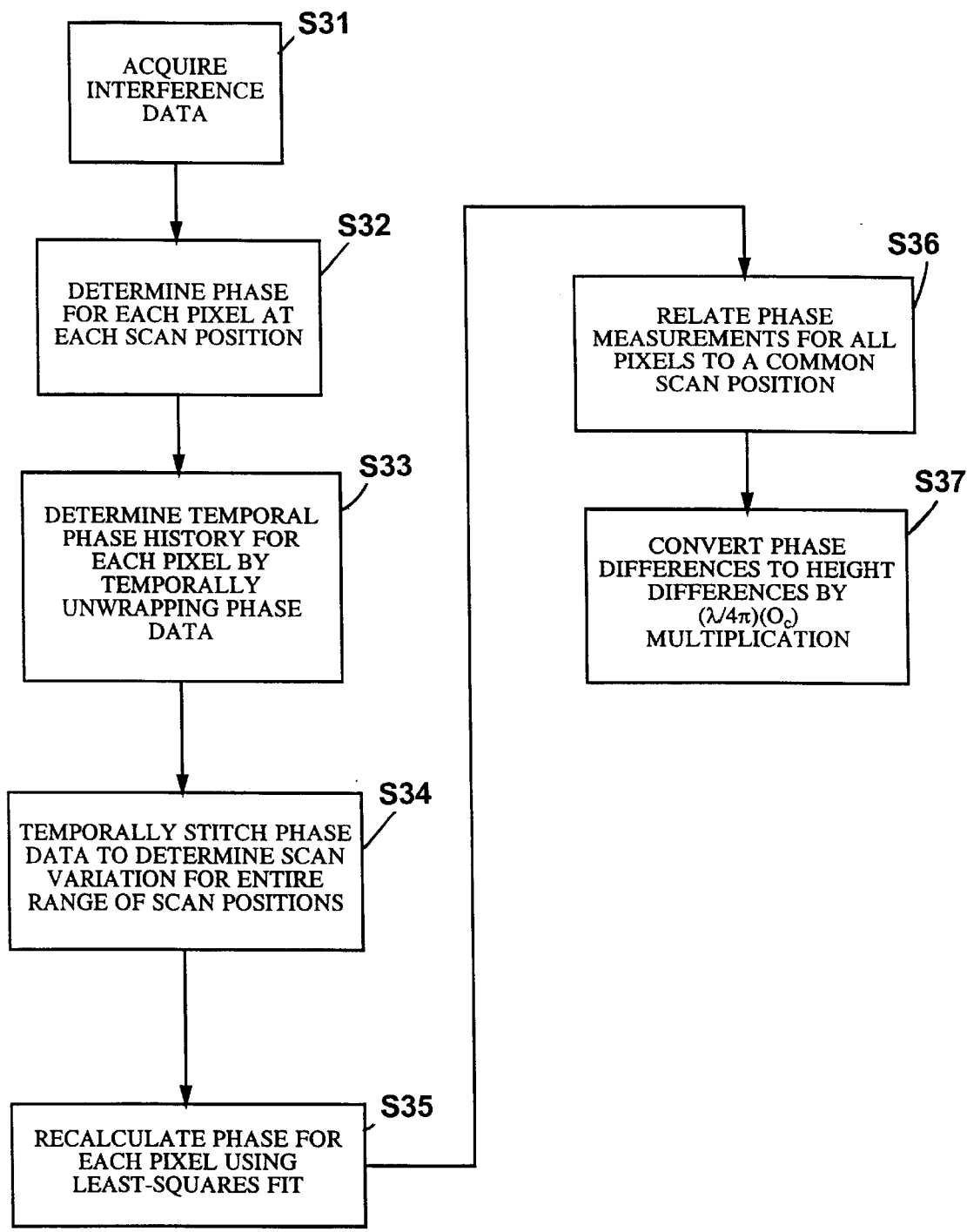
FIG. 13 is a flowchart of an interferometric process in which a PSI analysis is performed on interference data acquired using a low coherence illumination source, in accordance with an embodiment of the present invention.

More specifically, FIG. 13 illustrates an interferometric process used to determine the topography of a surface in the manner described. At Step S31, interference data is acquired using the system 10. Again, the interference data is acquired using the low coherence illumination source 12. A low coherence source is preferred because low coherence sources are less expensive than high coherence sources (such as lasers), and because they enable the system 10 to be used for other interferometric processes (such as conventional SWLI processes).

Figure 14A:
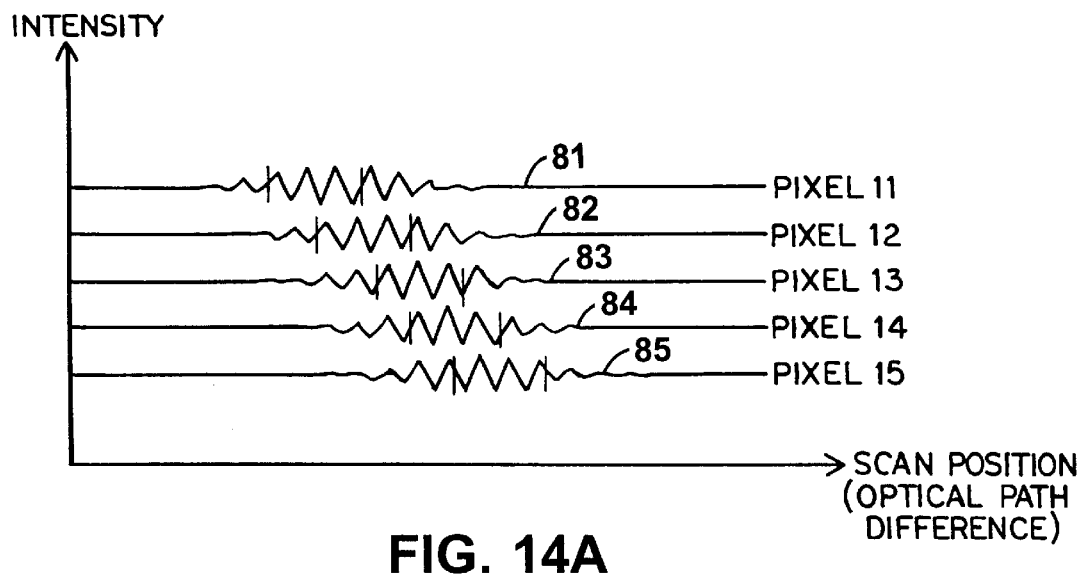
FIGS. 14A and 14B graphically illustrate interference data acquired during the process illustrated in FIG. 13.
Figure 14B:
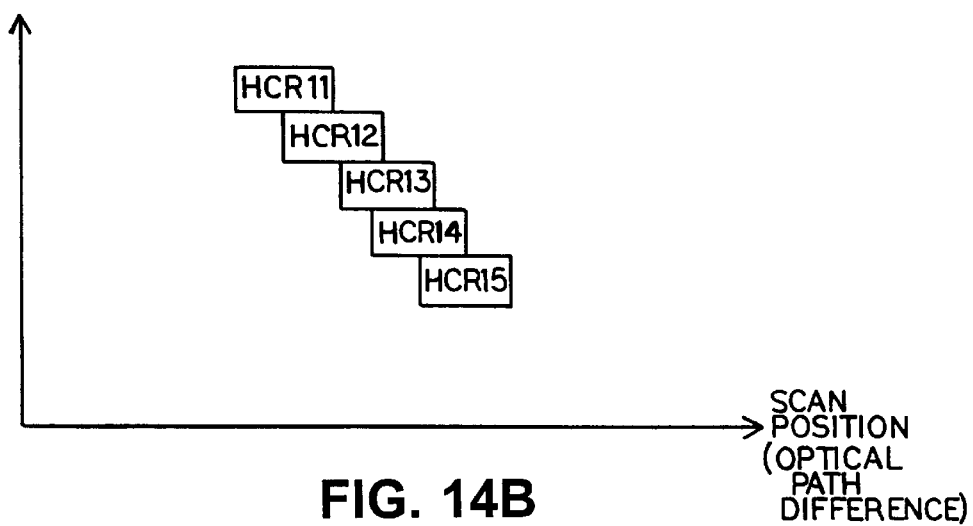

Exemplary interference data acquired during Step S31 is illustrated in FIGS. 14A and 14B. The data is acquired by eleventh through fifteenth pixels (Pixels 11–15) of the imaging device 36. The designation of the pixels as Pixels 11–15 is again merely for convenience, and is not intended to imply any particular location within the imaging device 36 or to imply that the pixels are next to each other. For purposes of illustration, assume that it is desired to determine the phase difference between Pixels 11 and 15. As described below, the scan variation between Pixels 11 and 15 is determined on the basis of (at least) Pixels 12–14, so that the phase variation attributable to the scan may be taken into account.

FIG. 14A illustrates curves 81, 82, 83, 84 and 85 which are intensity curves for Pixels 11–15, and FIG. 14B is a simplified version of FIG. 14A which symbolically illustrates only the high contrast regions HCR1, HCR2, HCR3, HCR4 and HCR5, respectively, for the curves illustrated in FIG. 14A. Again, the narrow high contrast regions occur because a low coherence illumination source is used during the acquisition.

At Step S32, after the interference data is acquired, the phase is determined for each pixel at each frame position at which high contrast fringes are available. Phase may be calculated, for example, by the following equation:

$$\phi_j = \tan^{-1}\left[\frac{2(I_{j-1} - I_{j+1})}{2I_j - I_{j-2} - I_{j+2}}\right] \quad (18)$$

For a given pixel, Eq. (18) is applied to the entire range (M) of scan positions j during which the pixel of interest experiences high contrast interference.

Figure 15:
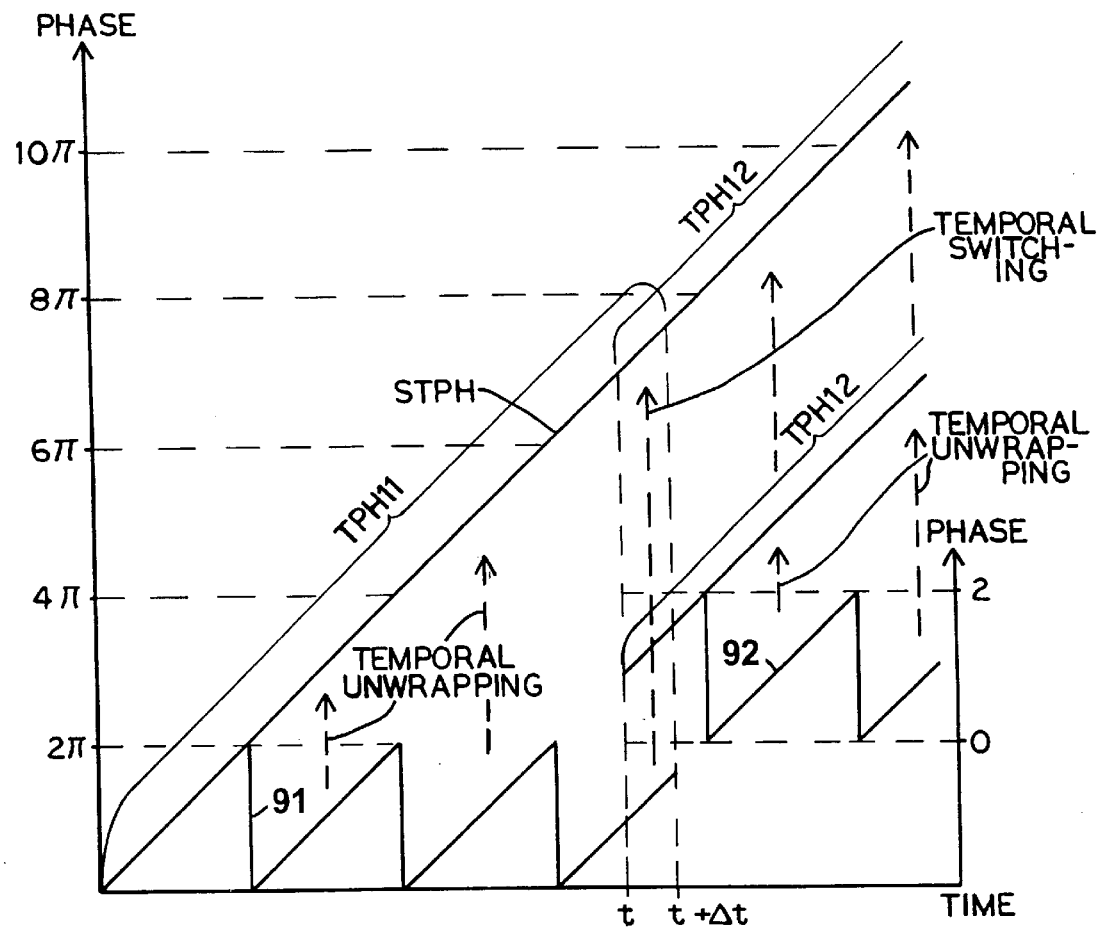
FIG. 15 graphically illustrates temporal phase unwrapping and temporal phase stitching performed during the process illustrated in FIG. 13.

Thus, using Eq. (18), phase curves such as curves 91 and 92 illustrated in FIG. 15 are generated. The curves 91 and 92 are phase curves for Pixels 11 and 12. For both curves 91 and 92, the phase increases from 0 to $2\pi$, whereafter there is a discontinuity caused by the principle value of the arctangent function. The phase variation is illustrated as being approximately linear. However, it should be noted that the phase variation may be non-linear due to scan non-linearities and/or the presence of external vibrations.

At Step S33, the temporal phase history for each pixel is determined by temporally unwrapping phase curves, such as the phase curves 91 and 92. Temporal unwrapping determines the phase variation between phase measurements which are adjacent in time, and is possible so long as the absolute value of the phase variation between adjacent samples is less than $\pi$. Thus, as illustrated in FIG. 15, temporal unwrapping allows the continuous evolution of phase by removing the discontinuous phase jumps associated with using the arctangent function, which only measures phase module $2\pi$. Individual $2\pi$ phase intervals are added together to produce the temporal phase history TPH11 for Pixel 11 and the temporal phase history TPH12 for Pixel 12. The temporal phase unwrapping allows phase variation to be properly determined by removing the discontinuous phase jumps. This step is performed for all of the pixels, such that temporal phase histories for all of the pixels of the imaging device 36 are determined.

At Step S34, a stitched temporal phase history is generated based on the temporal phase histories generated in Step S33. Generally speaking, phase stitching joins phase unwrapped sequences so that regions which are adjacent or overlap abut in a continuous manner. Temporal phase stitching is different than spatial phase stitching. With spatial phase stitching, the adjacent phase measurements are taken from points which are adjacent in space (e.g., neighboring pixels) rather than from points which are adjacent in time (e.g., neighboring camera frames).

As illustrated in FIG. 15, the temporal phase histories TPH11 and TPH12 are stitched together to create a portion of a stitched temporal phase history STPH. Then, temporal phase histories for other pixels corresponding to other scan positions are added to the stitched temporal phase history STPH, in order to determine the scan variation throughout the entire range of scan positions. For example, the temporal phase histories for Pixels 13 and 15 are added so that the scan variation between Pixels 11 and 15 can be determined.

As illustrated most clearly in FIG. 14B, the Pixels 12–14 exhibit favorable characteristics which permit their use to track the scan variation from Pixel 11 to Pixel 15. Namely, the Pixels 12–14 are intermediate to and span Pixels 11 and 15, and have significant overlap between their respective high contrast regions HCR12, HCR13, and HCR14 and the high contrast regions HCR11 and HCR15 of Pixels 11 and 15, respectively.

Preferably, rather than using only data from a single pixel to determine the scan variation at a given scan position, data from many pixels with overlapping high contrast regions is used. The advantage of using data from many pixels is that it reduces the susceptibility to error. The different pixels provide statistically independent data which, when averaged, will provide higher resolution of the scan variation at any given scan position. The method by which this averaging is accomplished and an average phase ramp history is obtained, is as follows: After the temporal phase unwrapping step S33 is performed for all pixels, phase increments $\delta_j = \phi_{j+1} - \phi_j$ are determined for all frames j in the high contrast region. The phases $\phi_j$ alone contain topographical phase as well as scan phase information, but the phase difference $\delta_j$ contains only phase ramp variations because the constant topographical phase is canceled out. Thus, the $\delta_j$'s for the same j calculated from a set of pixels whose high contrast regions overlap should be identical and constitute different measurements of the same phase increment. It is these phase increments which are averaged to produce an average phase increment $\overline{\delta}_j$. This process is repeated for all phase increments. A complete unwrapped phase ramp history can then be obtained by summing the averaged phase increments $\overline{\delta}_j$'s for all j's, using for example Eq. (19):

$$\Delta_m = \sum_{j=1}^{m} \overline{\delta}_j \quad (19)$$

Conceptually, this is the same as the temporal phase stitching illustrated in FIG. 15, except that the phase average of many pixels is used at each scan position.

At Step S35, the interferometric phase for each pixel is recalculated using a least-squares fit which takes into account the statistically improved scan variation information. Preferably, the sequence of intensity measurements used for this calculation is near the position of peak contrast to assure the highest quality phase determination. For example, the following Eqs. (20)–(21) may be used:

$$\begin{vmatrix} N & \sum \cos(\Delta_j) & \sum \sin(\Delta_j) \\ \sum \cos(\Delta_j) & \sum \cos^2(\Delta_j) & \sum \cos(\Delta_j)\sin(\Delta_j) \\ \sum \sin(\Delta_j) & \sum \cos(\Delta_j)\sin(\Delta_j) & \sum \sin^2(\Delta_j) \end{vmatrix} \begin{vmatrix} a_{i,0} \\ a_{i,1} \\ a_{i,2} \end{vmatrix} = \quad (20)$$

-continued $$\left| \begin{array}{c} \sum I_{i,j} \\ \sum I_{i,j} \cos(\Delta_j) \\ \sum I_{i,j} \sin(\Delta_j) \end{array} \right|$$

where $I_{ij}$ is the intensity measurement made at a given frame j by the pixel i whose phase is being measured, $\Delta_j$ is the above calculated average scan variation for the given frame, and $a_{i,0}$, $a_{i,1}$ and $a_{i,2}$ are the three unknowns of the least-squares fit. Equation (20) is one form of a well-known least-squares fit of the measured sinusoidal variation intensity to the expected variation (see Eq. (12)).

After solving Eq. (20) for the unknowns $a_0$, $a_1$ and $a_2$, the phase for pixel i may then be calculated using Eq. (21).

$$\phi_i = \tan^{-1}\left[\frac{a_{i,2}}{a_{i,1}}\right] \quad (21)$$

The least squares methodology results in a dramatic improvement of the accuracy of the phase calculation in Eq. (21), not only because the statistically improved scan variation information is used, but also because the parameters $\Delta_j$ do not assume a constant scan variation from frame-to-frame as was the case with Eq. (9) at Step S32. Indeed, a large amount of the inaccuracy associated with conventional PSI methods stems from the fact that a constant/linear scan variation is assumed.

The phases calculated in Step S35 (Eq. (21)) are again modulo $2\pi$ due to the principle value of the arctangent function. At Step S36, these phases are connected to remove this ambiguity by relating them to a single common scan position. The phase history calculated in Step S34 (the $\Delta_j$'s) can resolve the $2\pi$ ambiguities and provide the final surface phase map, using for example, Eq. (22).

$$\phi_i = \phi_i - \phi_{org} + 2\pi \operatorname{round}\left[\frac{\Delta_i - \Delta_{org} - (\phi_i - \phi_{org})}{2\pi}\right] \quad (22)$$

where $\phi_{org}$ is the corrected phase of the common scan position (the new origin), $\phi_i$ is the corrected phase of pixel i calculated using Eq. (21), and $\Delta_i$ is the phase ramp history calculated from Eq. (19). The round function was previously defined, see Eq. (9). Eq. 22 assumes that the absolute value of the phase difference between the corrected phases $\phi_i$ and the $\Delta$'s is smaller than $\pi$, which under all but the most severe vibration conditions will be true.

At Step S37, the phase differences are converted to height differences by multiplying the phase differences by ($\lambda/4\pi$) ($O_c$), in the same manner as described above in conjunction with Step S10 of FIG. 2. Thus, the surface profile is determined.

Advantageously, therefore, the process performs a PSI-type analysis using a low coherence illumination source. Thus, it is now possible to provide a single interferometric system having a low coherence illumination source which can perform both SWLI-type measurements and PSI-type measurements. Low coherence sources are preferred because, as compared to high coherence sources, they are less expensive, their spectrum can be shaped, they do not have any specialized requirements, and they do not produce coherent artifacts stemming from stray reflections. Finally, the amount of vertical displacement which can be measured is larger than that which can be measured using conventional PSI approaches.

V. Interferometric Process Involving Performance of PSI Analysis on Phase Connectable Groups Referring now to FIGS. 16–18, an embodiment of the invention which incorporates the process of FIG. 13 is illustrated.

By way of overview, in practice, many types of surfaces are comprised of a limited number of step-type features. For these types of surfaces, the analysis described in FIG. 13 can be simplified and improved by treating pixels corresponding to a particular step height as a "group". This allows a PSI analysis to be performed within the group, followed by a phase connection of entire groups using the scan variation information.

Figure 16:
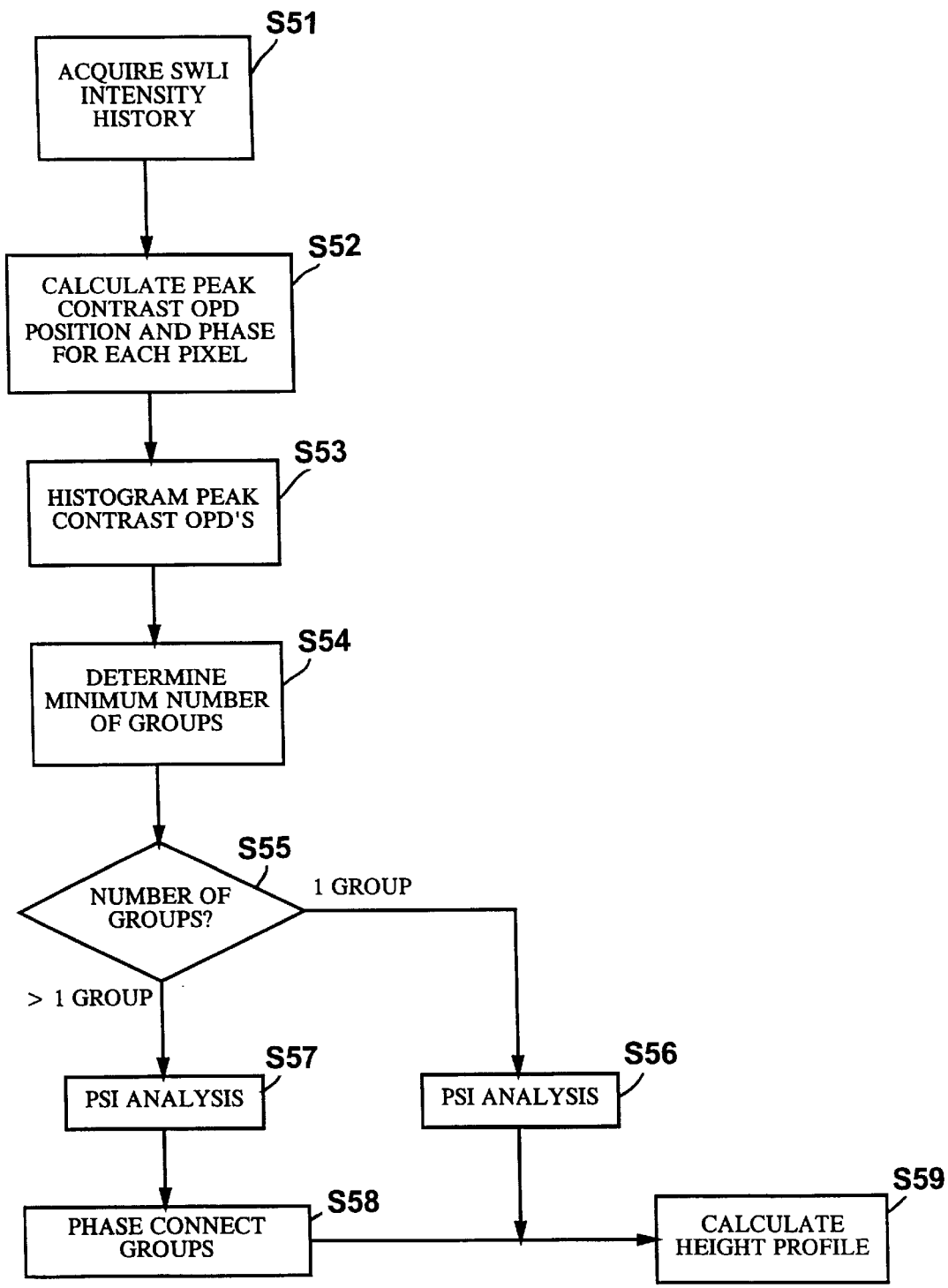
FIG. 16 is a flowchart of a preferred embodiment of the invention incorporating the process illustrated in FIG. 13.

More specifically, FIG. 16 illustrates a process which proceeds in the described manner. At Step S51, interference data is acquired using the system 10 including the low coherence illumination source 12. At Step S52, the peak contrast position and phase for each pixel are calculated.

Figure 17:
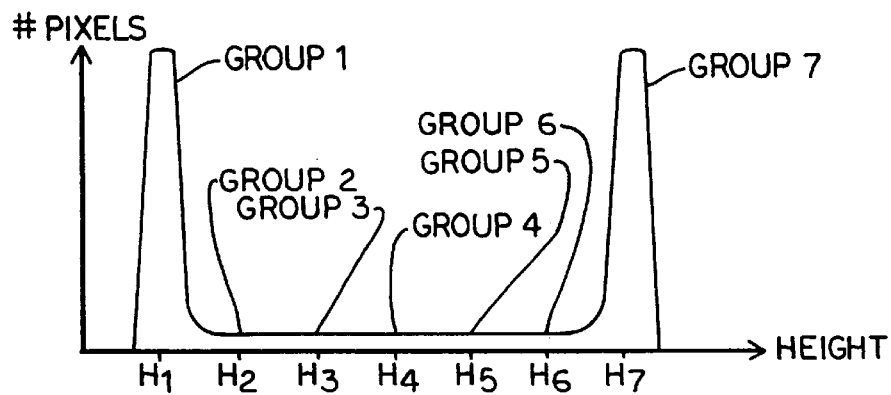
FIG. 17 is a histogram generated during the process illustrated by the flowchart of FIG. 16.

At Step S53, a histogram is generated which organizes the pixels according to measured height. The pixels are histogrammed using the SWLI analysis performed in Step S52. A graphical representation of such a histogram is illustrated in FIG. 17. The histogram of FIG. 17 corresponds to the test surface illustrated by the curve in FIG. 18.

At Step S54, a minimum number of groups is determined. It is generally desirable to put as many pixels into as small a number of groups as possible, in order to maximize the extent to which the pixels can be compared to each other using a conventional PSI analysis without phase connecting. In order for pixels to be within the same group, they must have overlapping regions of contrast. In other words, there must be a sequence of scan positions which is sufficient in length that it can be used for phase calculations, and during which all of the pixels experience high contrast interference. This condition must be met so that a PSI analysis may be performed on the pixels in the group using simultaneously-acquired interference data.

Figure 18:
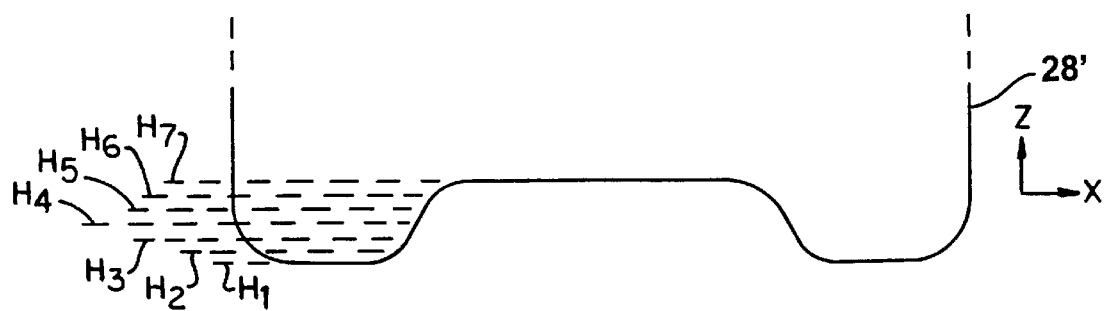
FIG. 18 schematically illustrates a surface profiled during the process illustrated by the flowchart of FIG. 16.

As illustrated in FIG. 18, the exemplary test surface 28' comprises a relatively large number of locations which are at a step height $H_1$, a relatively large number of locations which are at another step height $H_7$, and a relatively small number of locations which are at intermediate heights $H_2$–$H_6$ which span the heights $H_1$ and $H_7$. All of the pixels are placed into one of the Groups 1–7 corresponding to the heights $H_1$–$H_7$, respectively. It is assumed that seven groups is the smallest number of groups which can be used while still permitting a PSI analysis to be performed within each group.

At Step S55, it is determined whether or not there is more than one group. If there is only one group, meaning that all of the pixels can be analyzed using a conventional PSI analysis without phase connecting, then a PSI analysis is performed on all pixels, and no phase connecting is performed (Step S56). It should be noted that while no phase connecting is performed, the PSI analysis can still be conducted with the benefit of the scan variation information using the least-squares fit of Eqs. (19) and (20).

In the illustrated example, there are seven groups. Therefore, at Step S57, a PSI analysis is performed on a group-by-group basis, that is, a PSI analysis is performed to compare the phases of all of the pixels within Group 1, then another PSI analysis is performed to compare the phases of all of the pixels within Group 2, and so on. Again, the PSI analysis can be conducted with the benefit of the scan variation information using the least squares fit of Eqs. (19) and (20). Advantageously, therefore, all of the pixels in Groups 1 and 7 are compared to each other directly using a conventional PSI analysis.

At Step 58, Groups 1 to 7 are phase connected. This can be accomplished using the techniques described in conjunction with FIG. 13. Given that there are seven groups upon which a PSI analysis is performed, there are seven sequences of scan positions to be phase connected. Thus, phase connecting all of the pixels is reduced to phase connecting the seven sequences of scan positions. At Step S59, after the groups are phase connected, a height profile is calculated using techniques previously described.

Advantageously, therefore, the process illustrated in FIG. 16 provides a simplified analysis for surfaces that are comprised of a limited number of step-type features. The analysis is simplified because it is not necessary to phase connect each individual pixel. Rather, a group of pixels at a given step height can be compared to each other directly using a PSI analysis, and then intermediate groups of pixels can be used to phase connect the groups of pixels at different step heights.

Many other changes and modifications may be made to the present invention without departing from the spirit thereof. The scope of these and other changes will become apparent from the appended claims.

I claim:

1. A method of determining a position of a peak of a contrast function, the method comprising the steps of:
    (A) receiving light at a pixel of an imaging device, the light being received in the form of a three-dimensional interferogram comprised of a carrier modulated by the contrast function;
    (B) digitally sampling an intensity variation of the three-dimensional interferogram to acquire N samples;
    (C) determining M frequency domain transform coefficients based on the intensity variation;
    (D) using L frequency domain transform coefficients in an equation which determines the position of the peak of the contrast function, the L frequency domain transform coefficients being among the M frequency domain transform coefficients determined in step (C), the L frequency domain transform coefficients corresponding to a low frequency component of the intensity variation.

2. A method according to claim 1, wherein L is equal to one, and wherein the equation has the form $z = A \tan^{-1}(B)$, where z is the position of the contrast peak, A is a constant, and B is a value which is determined based on the frequency domain transform coefficient.

3. A method according to claim 2, wherein $B = Im(c)/Re(c)$, where c is the frequency domain transform coefficient, $Im(c)$ is an imaginary portion of the frequency domain transform coefficient and $Re(c)$ is a real portion of the frequency domain transform coefficient.

4. A method according to claim 1, wherein L is equal to one, and wherein the frequency domain transform coefficient which is used in the equation is the lowest non-zero frequency domain coefficient transform which can be determined given the number N of samples acquired.

5. A method according to claim 1, wherein the pixel is a first pixel, wherein the contrast peak is a first contrast peak, and wherein the method further comprises the steps of
    repeating steps (A) and (B) for light received at a second pixel to determine a position of a second contrast peak; and
    determining a difference in height between first and second locations on a test surface based on a difference in position of the first and second contrast peaks, the first and second locations reflecting the light received at the first and second pixels, respectively.

6. A method according to claim 1, wherein the L frequency domain transfer coefficients are coefficients of a rectified intensity signal, and wherein the separating step further comprises:
    subtracting a DC component from the intensity variation to produce a DC-subtracted intensity signal, and then
    rectifying the DC-subtracted intensity signal to produce the rectified intensity signal.

7. A method according to claim 6, wherein the rectifying step is performed by squaring the DC-subtracted intensity signal.

8. A method according to claim 1, wherein L is equal to M and M is equal to one.

9. A method of determining a difference in height between first and second locations on a test surface, the method comprising the steps of:
    (A) producing an interferogram, including the steps of
        (1) reflecting a reference light beam and a test light beam, the test light beam being reflected from the test surface, and
        (2) recombining the reference light beam and the test light beam;
    (B) imaging the interferogram on a photosensitive device, the photosensitive device including a first pixel which receives light reflected from the first location and a second pixel which receives light reflected from the second location, the light received at the first pixel and the light received at the second pixel each having an intensity variation which varies as a function of scan position and which is comprised of a carrier modulated by a contrast function;
    (C) determining a first position of a first contrast peak of the light received at the first pixel, step (C) consisting essentially of the following steps
        (1) determining a frequency domain transform coefficient based on the intensity variation, and
        (2) using the frequency domain transform coefficient in an equation which determines a position of a peak of the contrast function, the equation having the form $z = A \tan^{-1}(B)$, where z is the position of the contrast peak, A is a constant, and B is a value which is determined based on the frequency domain transform coefficient;
    (D) determining a second position of a second contrast peak of the light received at the second pixel, the step (D) consisting essentially of repeating steps (C)(1) and (C)(2) for the light received at the second pixel; and
    (E) determining the difference in height between the first and second locations based on a difference in position between the first contrast peak and the second contrast peak.

10. A method according to claim 9, wherein $B = Im(c)/Re(c)$, where c is the frequency domain transform coefficient, $Im(c)$ is an imaginary portion of the frequency domain transform coefficient and $Re(c)$ is a real portion of the frequency domain transform coefficient.

11. A method according to claim 9, wherein the step of imaging the interferogram includes the step of digitally sampling the intensity variation of the light received by the first and second pixels to acquire a number of samples, and wherein the frequency domain transform coefficient is the lowest non-zero frequency coefficient which can be determined given the number N of samples acquired.

12. A method according to claim 9, wherein the step of determining the frequency domain transfer coefficient includes the steps of:

subtracting a DC component from the intensity variation to produce a DC-subtracted intensity signal, and then squaring the DC-subtracted intensity signal to produce a rectified intensity signal.

13. An optical interferometer comprising:

an illumination source, the illumination source producing a light beam;

a beam splitter, the beam splitter splitting the light beam into a reference light beam and a test light beam, the test light beam being reflected from a test surface;

a photosensitive device, the photosensitive device having an interferogram imaged thereon, the interferogram being produced by a recombination of the reference light beam and the test light beam, the photosensitive device including a first pixel which receives light reflected from a first location on the test surface and a second pixel which receives light reflected from a second location on the test surface; and a computer, the computer being coupled to the photosensitive device, the computer determining a difference in height between the first and second locations based on a difference in position between a first contrast peak for light received by the first pixel and a second contrast peak for light received at the second pixel wherein, to determine the position of each of the first and second contrast peaks, the computer determines a frequency domain transform coefficient based on the intensity variation and uses the frequency domain transform coefficient in an equation having the form $z = A \tan^{-1}(B)$, where z is the position of a respective one of the first and second contrast peaks, A is a constant, and B is a value which is determined based on the frequency domain transform coefficient.

14. An optical interferometer according to claim 13, wherein $B = Im(c)/Re(c)$, where c is the frequency domain transform coefficient, $Im(c)$ is an imaginary portion of the frequency domain transform coefficient and $Re(c)$ is a real portion of the frequency domain transform coefficient.

15. An optical interferometer according to claim 13, wherein only one frequency domain transform coefficient is determined to determine the first contrast peak, and wherein only one frequency domain transform coefficient is determined to determine the second contrast peak.

16. A method of determining a difference in height between first and second locations on a test surface, the method comprising the steps of:

(A) producing a three-dimensional interferogram using a low coherence illumination source, including the steps of (1) reflecting a reference light beam and a test light beam, the test light beam being reflected from the test surface, and (2) recombining the reference light beam and the test light beam;

(B) imaging the three-dimensional interferogram on the photosensitive device, the photosensitive device including a first pixel which receives light reflected from the first location and a second pixel which receives light reflected from the second location;

(C) determining a first position of a first contrast peak for the light received by the first pixel, including the steps of (1) digitally sampling the intensity variation at a predefined rate to acquire a number N of samples, (2) subtracting a DC component from the sampled intensity variation to produce a DC-subtracted intensity signal, (3) rectifying the DC-subtracted intensity signal to produce a rectified intensity signal, (4) determining a frequency domain transform coefficient for the rectified intensity signal, and (5) determining the location of the contrast peak by using the frequency domain transform coefficient in an equation, the equation having the form $z = A \tan^{-1}(Im(c)/Re(c))$, where z is the position of the contrast peak, A is a constant, c is the frequency domain transform coefficient, $Im(c)$ is an imaginary portion of the frequency domain transform coefficient, and $Re(c)$ is a real portion of the frequency domain transform coefficient;

(D) determining a second position of a second contrast peak by repeating steps (C)(1) to (C)(5) for the light received by the second pixel; and (E) determining the difference in height by comparing the first position of the first contrast peak and the second position of the second contrast peak.

17. A method according to claim 16, wherein for each of the first and second pixels, a total number M of frequency domain transform coefficients are determined based on the intensity variation, M being substantially less than N/2.

18. A method according to claim 17, wherein M is equal to one such that the frequency domain transform coefficient C is the only frequency transform coefficient which is determined.

19. A method according to claim 18, wherein the frequency domain transform coefficient C is the lowest non-zero frequency domain transform coefficient which can be determined given the number N of samples acquired.

* * * * *